(12) United States Patent
Kawaguchi et al.

(10) Patent No.: US 7,103,572 B1
(45) Date of Patent: Sep. 5, 2006

(54) ELECTRONIC ASSET UTILIZATION SYSTEM, ELECTRONIC ASSET UTILIZATION METHOD, SERVER FOR USE WITH ELECTRONIC ASSET UTILIZATION SYSTEM, AND RECORDING MEDIUM HAVING RECORDED THEREON ELECTRONIC ASSET UTILIZATION METHOD

(75) Inventors: Kyoko Kawaguchi, Chiba (JP); Hisashi Takayama, Tokyo (JP); Tetsuo Matsuse, Nara (JP); Akio Shibata, Saitama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/505,810

(22) Filed: Feb. 17, 2000

(30) Foreign Application Priority Data

Feb. 18, 1999 (JP) ................................. 11-039543

(51) Int. Cl.
*G06Q 40/00* (2006.01)
(52) U.S. Cl. ......................................... 705/40; 705/39
(58) Field of Classification Search ................. 705/39, 705/40; 325/375, 380
See application file for complete search history.

(56) References Cited

U.S. PATENT DOCUMENTS

| | | | |
|---|---|---|---|
| 5,671,279 A * | 9/1997 | Elgamal ....................... 380/29 |
| 5,754,654 A * | 5/1998 | Hiroya et al. ................. 705/76 |
| 5,768,528 A | 6/1998 | Stumm |
| 5,809,144 A * | 9/1998 | Sirbu et al. .................. 380/282 |
| 5,915,022 A * | 6/1999 | Robinson et al. ............. 380/30 |
| 5,982,893 A * | 11/1999 | Hughes ........................ 705/75 |
| 5,996,076 A * | 11/1999 | Rowney et al. ............... 705/76 |
| 6,016,484 A * | 1/2000 | Williams et al. ............ 235/375 |
| 6,032,260 A * | 2/2000 | Sasmazel et al. ........... 713/202 |
| 6,076,068 A * | 6/2000 | DeLapa et al. ............... 705/14 |
| 6,108,644 A * | 8/2000 | Goldschlag et al. ........ 380/277 |
| 6,125,349 A * | 9/2000 | Maher ........................... 705/1 |
| 6,240,396 B1 * | 5/2001 | Walker et al. ................ 705/13 |
| 6,247,000 B1 * | 6/2001 | Hawkins et al. .............. 705/37 |
| 6,442,532 B1 * | 8/2002 | Kawan ........................ 705/35 |

FOREIGN PATENT DOCUMENTS

JP           40930566 A    *  11/1997

* cited by examiner

*Primary Examiner*—Alain L. Bashore
(74) *Attorney, Agent, or Firm*—Pearne & Gordon LLP

(57) ABSTRACT

An electronic asset utilization system is constituted of a stationary terminal 11, such as a set-top box (STB), a mobile terminal 13, such as a portable cellular phone, and a server 15. The server 15 receives an order for an electronic asset from the stationary terminal 11 or the mobile terminal 13; downloads to the stationary terminal 11 or the mobile terminal 13 an electronic asset and an exchange or receipt certificate to be described later; retains the thus-issued electronic asset, exchange certificate, or receipt certificate; and settles a charge billed to the thus-ordered electronic asset.

The stationary terminal 11, the mobile terminal 13, and the server 15 are connected to a communications network.

31 Claims, 13 Drawing Sheets

FIG.3

| 300a | 300b | 300c | 300d | 300e | 300f |
|---|---|---|---|---|---|
| ELECTRONIC ASSET ID | DATE AND TIME OF ISSUE OF ELECTRONIC ASSET | EXPIRATION DATE OF ELECTRONIC ASSET | PRESENCE/ ABSENCE OF EXCHANGE TICKET | EXPIRATION DATE OF EXCHANGE TICKET | STATUS |
| 123456788 | 2000/12/14 13:10:11 | 2000/12/31 22:00:00 | YES | 2000/12/30 00:00:00 | COMPLETION OF A REFUND |
| 123456789 | 2000/12/14 13:12:11 | 2000/12/31 22:00:00 | YES | 2000/12/30 00:00:00 | AWAITING A USER'S REQUEST FOR EXCHANGE |
| 123456790 | 2000/12/14 13:12:19 | 2000/12/31 22:00:00 | YES | 2000/12/30 00:00:00 | AWAITING DOWNLOADING OF DATE PERTAINING TO A DESIGNATED EXPIRATION DATE |
| 123456798 | 2000/12/14 13:13:13 | 2001/04/01 22:00:00 | NO | 2000/12/30 00:00:00 | COMPLETION OF DOWNLOADING OF AN ELECTRONIC ASSET |
| 123456799 | 2000/12/14 13:17:11 | 2000/12/31 22:00:00 | YES | 2000/12/30 00:00:00 | COMPLETION OF DOWNLOADING OF AN ELECTRONIC ASSET |
| ... | ... | ... | ... | ... | ... |

300

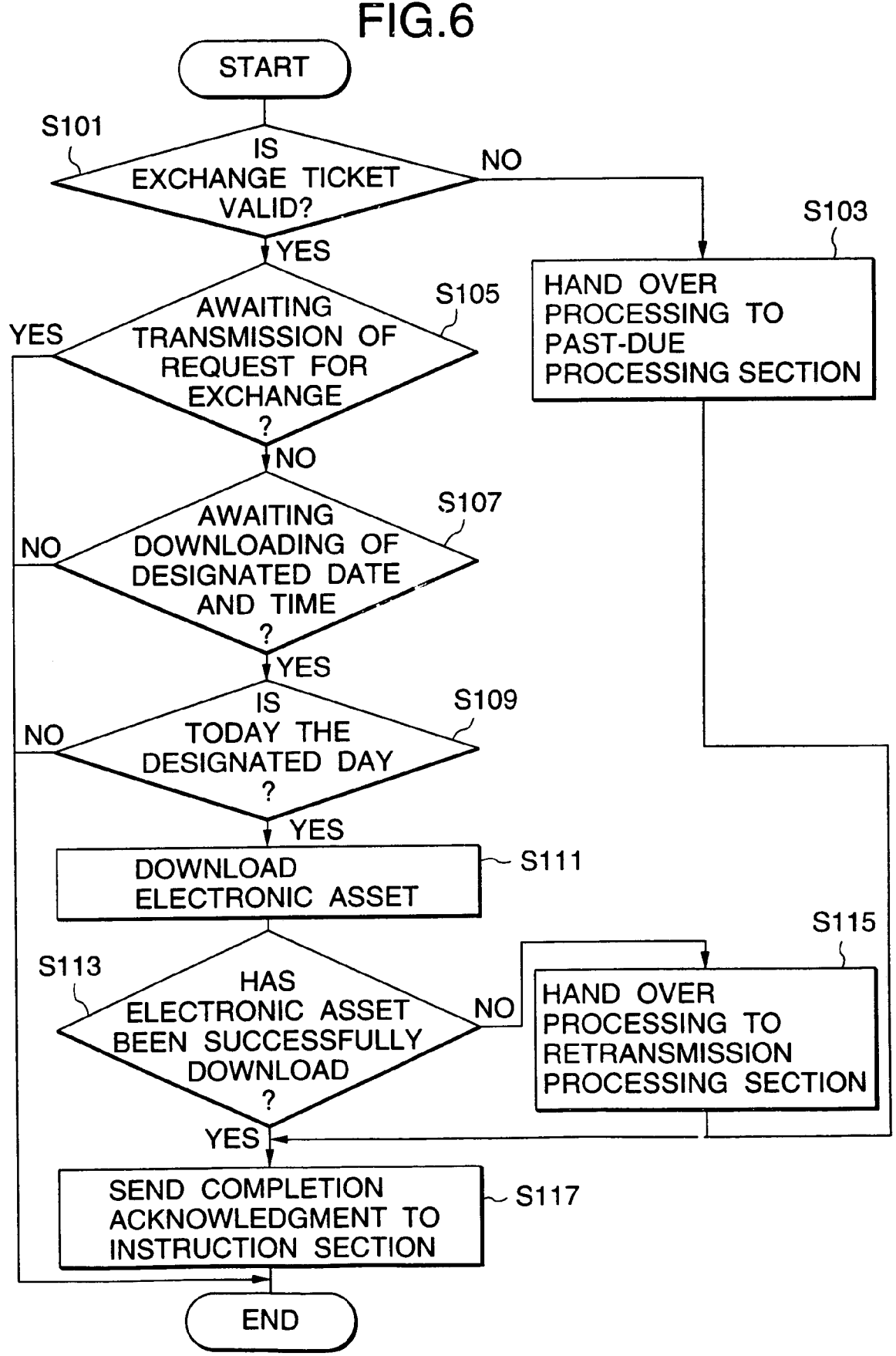

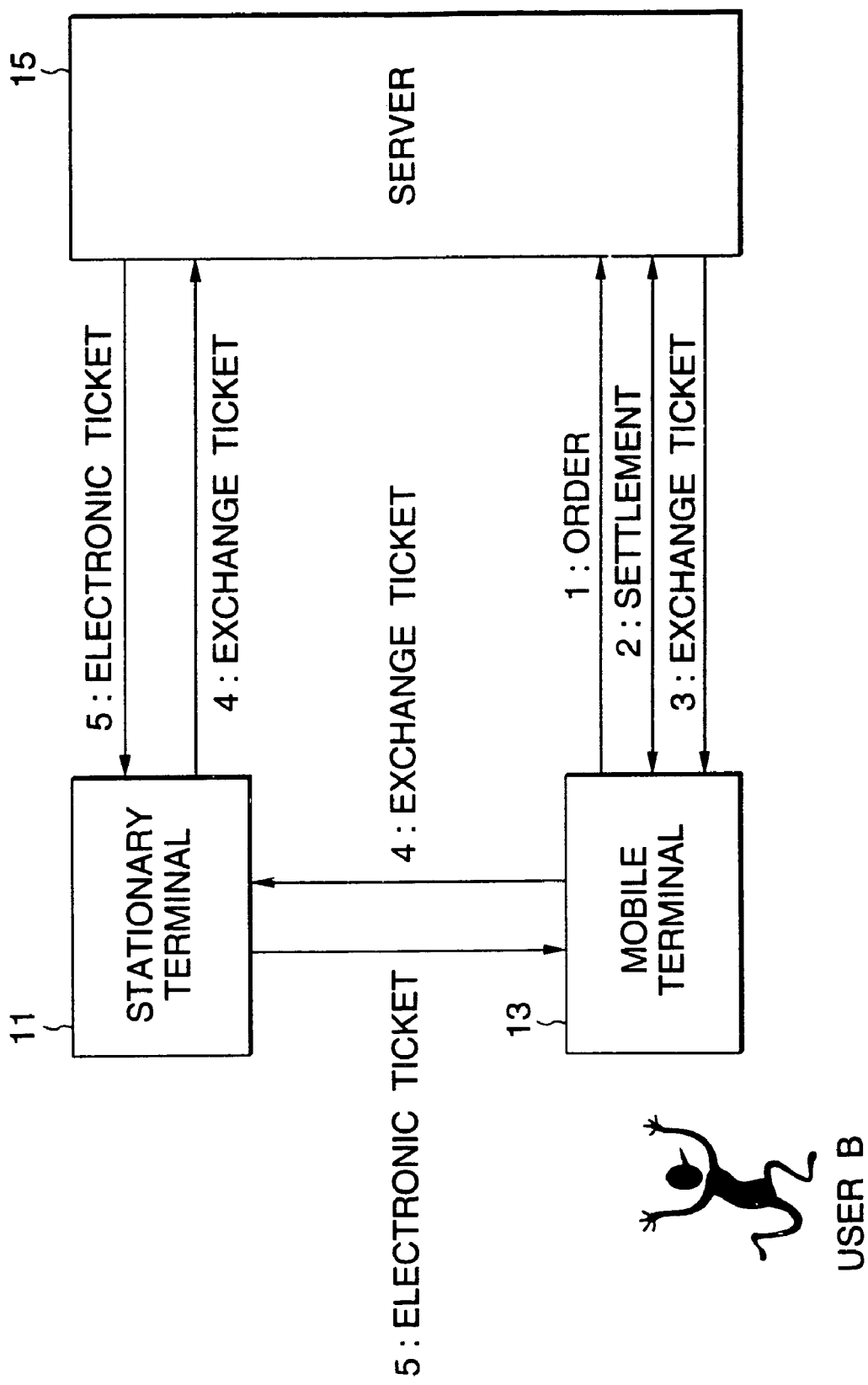

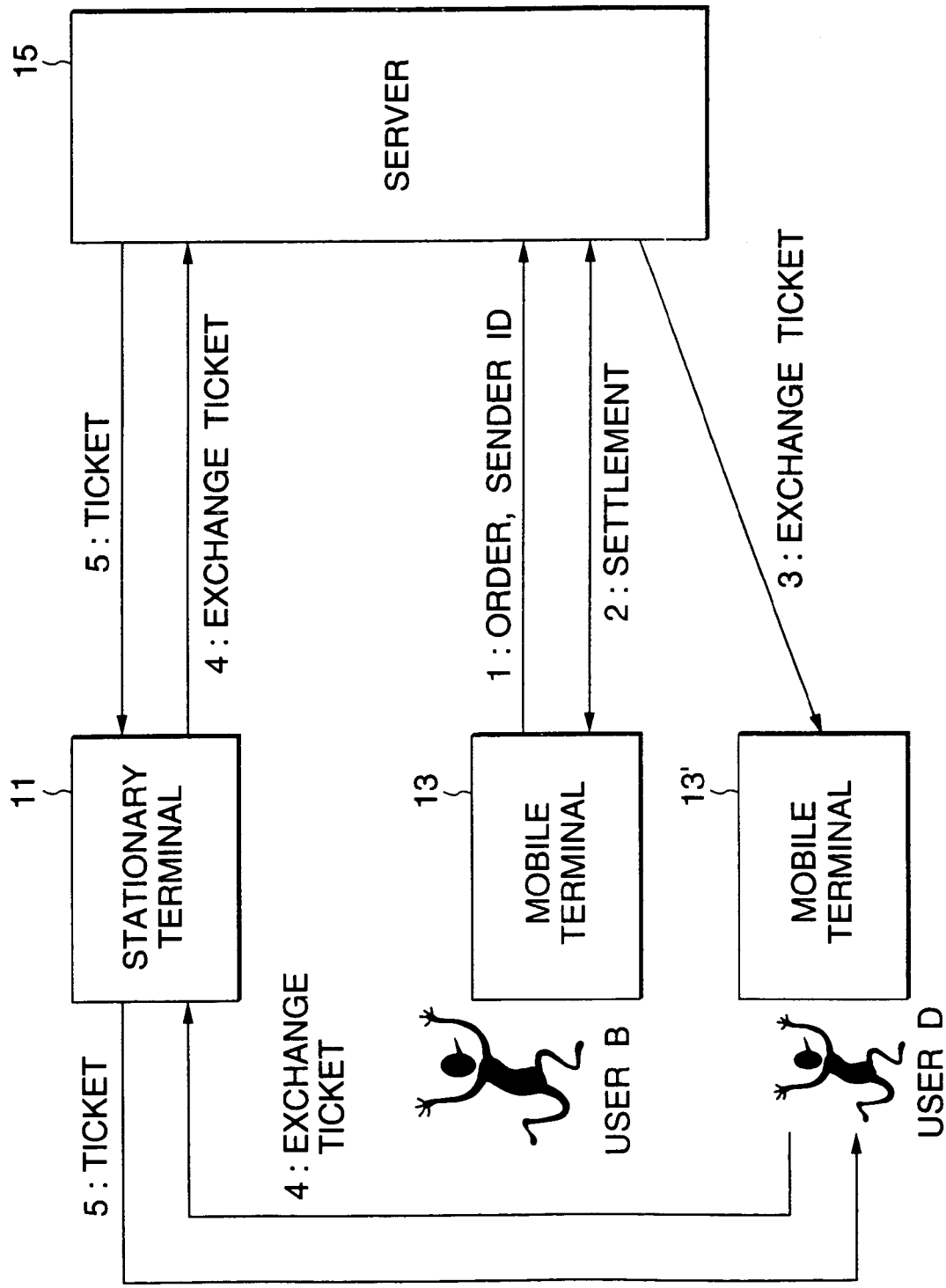

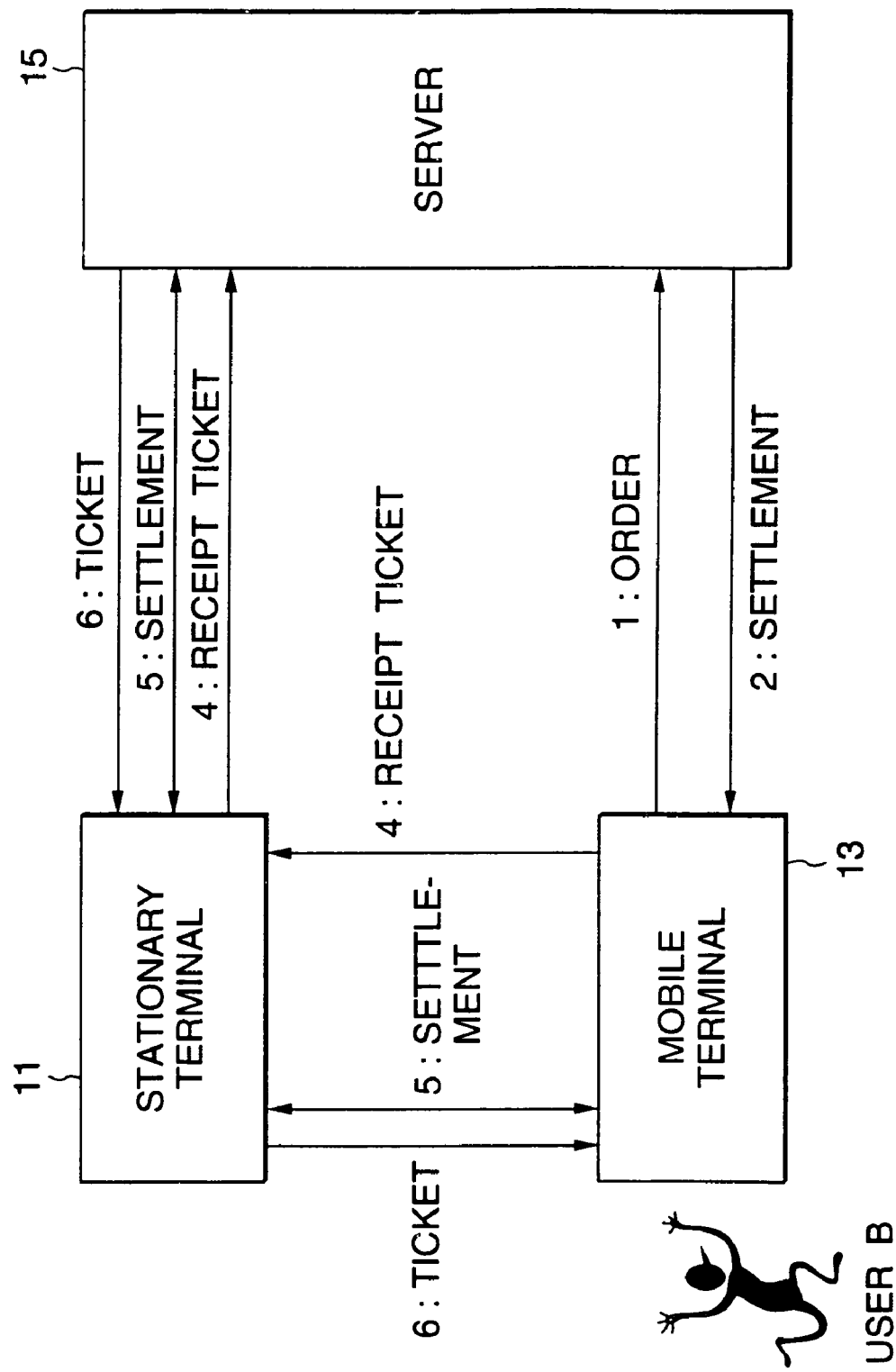

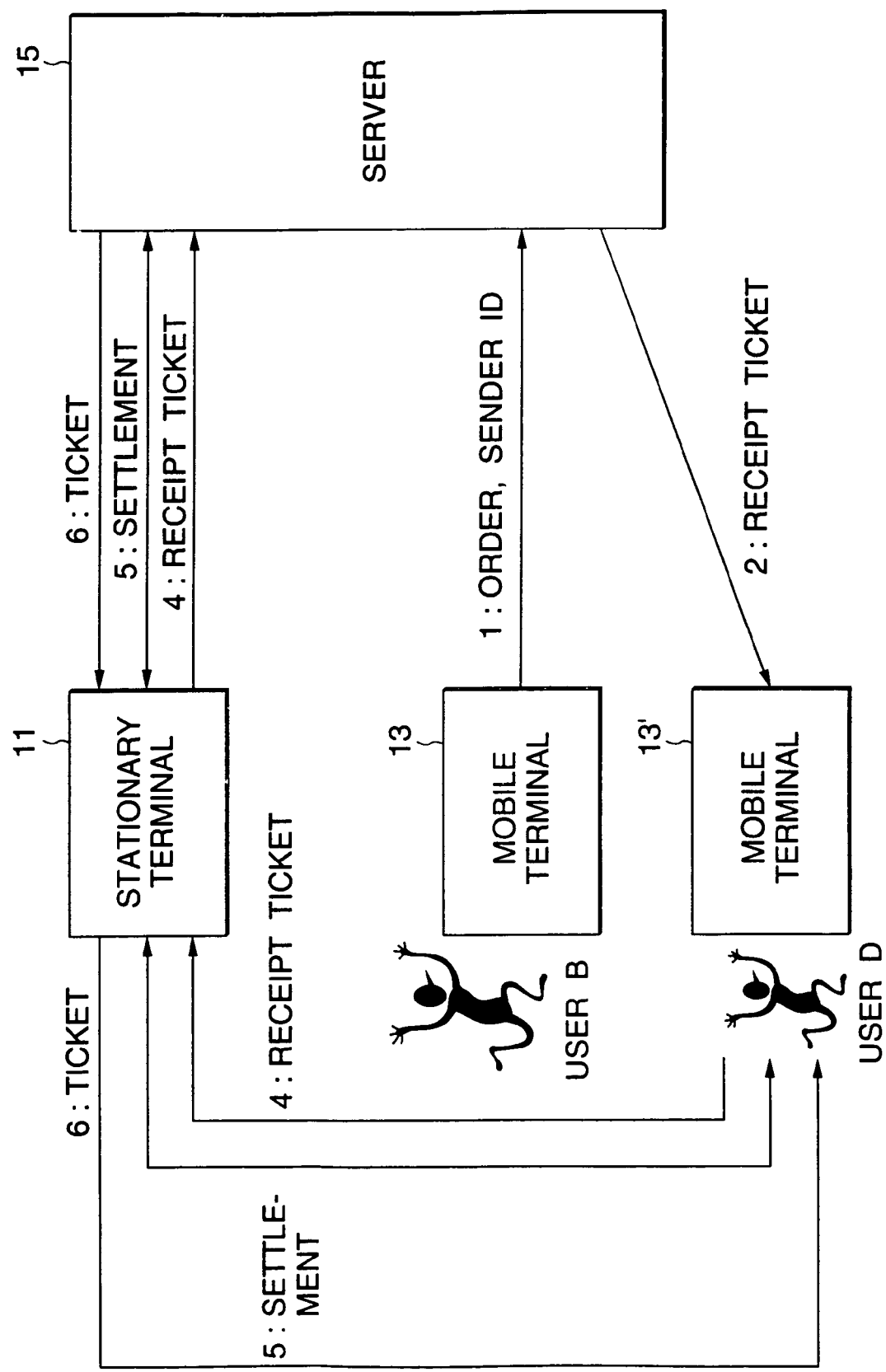

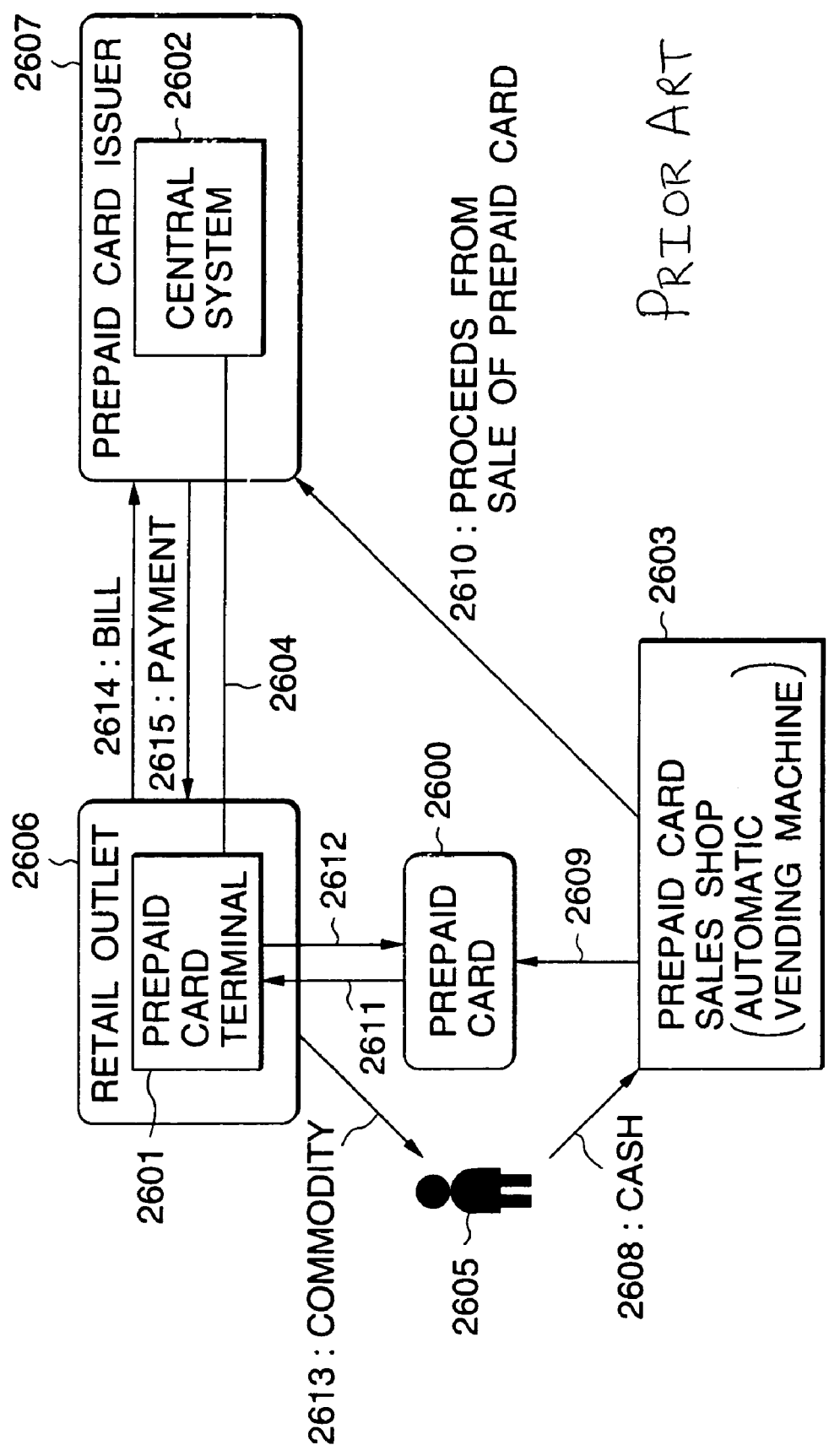

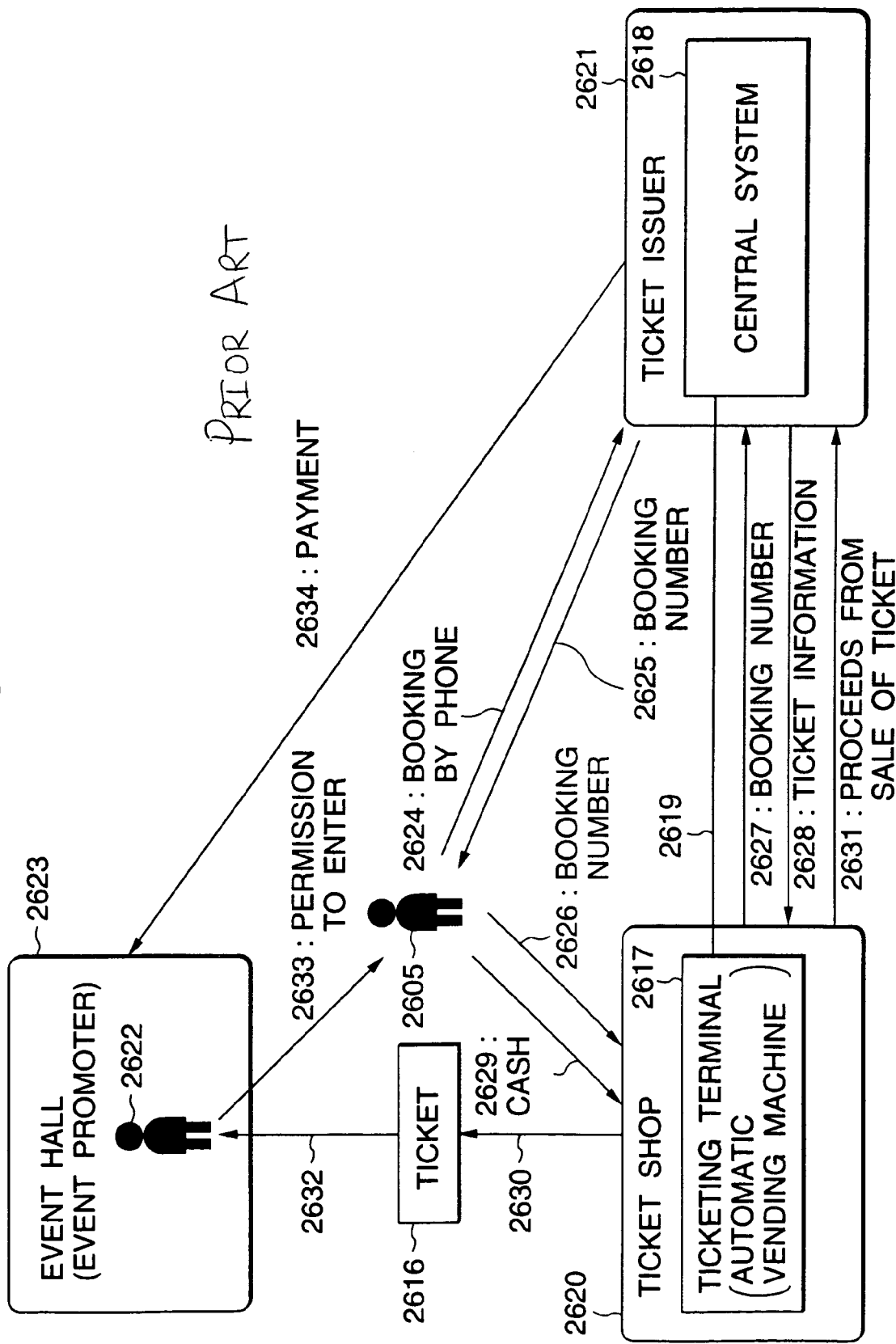

US 7,103,572 B1

ELECTRONIC ASSET UTILIZATION SYSTEM, ELECTRONIC ASSET UTILIZATION METHOD, SERVER FOR USE WITH ELECTRONIC ASSET UTILIZATION SYSTEM, AND RECORDING MEDIUM HAVING RECORDED THEREON ELECTRONIC ASSET UTILIZATION METHOD

BACKGROUND OF THE INVENTION

The present invention relates to an electronic asset utilization system and an electronic asset utilization method, which are intended to effect utilization of an electronic prepaid card or an electronic ticket (which will hereinafter be collectively referred to as "electronic asset"), such as purchase of electronic asset. Further, the present invention relates to a server for use with the electronic asset utilization system and method, as well as to a recording medium on which there is recorded a program for carrying out the electronic asset utilization method.

References to the figures referred to in this section may provide a parenthetical second reference number to refer to the diagrammatic representation of a transaction taking place (a "verb") utilizing an element, while the non-parenthetical reference numbers refer to the element (a "noun") itself that is, if appropriate, involved in the transaction.

Next will be described the existing prepayment-type settlement system using a prepaid card, by reference to FIG. 13.

In the drawing, a prepaid card terminal 2601 disposed in a retail outlet 2606 is to settle transactions by use of a prepaid card. The prepaid card terminal 2601 is connected to a central system 2602 of a prepaid card issuer 2607 by way of a communications line 2604. In some retail outlets, the prepaid card terminal 2601 is connected to the central system 2602 of the prepaid card issuer 2607 by way of a POS (point-of-sale) system disposed in the retail outlet and the communications line 2604.

Before purchasing a commodity product at the retail outlet 2606 through use of a prepaid card, a consumer 2605 first purchases a prepaid card 2600 (2609) from a prepaid card sales shop 2603 by paying cash (2608). The proceeds of the sale of the prepaid card are sent to the prepaid card issuer 2607 from the prepaid card sales shop 2603 (2610).

The consumer 2605 hands the prepaid card 2600 over to a clerk in the retail outlet 2606 (2611) and asks him to settle the transaction by use of the prepaid card. When the clerk inserts the prepaid card 2600 into a card reader of the prepaid card terminal 2601 and performs a prepaid-card settlement operation, the prepaid card terminal 2601 reads, from the prepaid card, data pertaining to the available balance of the card (hereinafter referred to simply as "balance data") and writes, into the prepaid card 2600, new balance data calculated by deduction of the cost of the commodity product from the balance data. The prepaid card terminal 2601 prints, through use of a printer, an accounting statement on which appear a bill citing the commodity price and the new balance data pertaining to the prepaid card 2600. The clerk hands over to the consumer 2605 (2612 and 2613) the purchased commodity, the prepaid card 2600, and the accounting statement, thus terminating the settlement of the transaction using the prepaid card.

Subsequently, the prepaid card terminal 2601 bills a charge to the central system 2602 of the prepaid card issuer 2607 on the basis of the amount deduced from the prepaid card 2600, byway of the communications line 2604(2614). Upon being charged, the prepaid card issuer 2607 pays the charge to the retail outlet 2606 (2615).

There may be a case where a prepaid card is purchased from a prepaid card vending machine or a case where the prepaid card terminal 2601 is embodied as a vending machine or a public phone having the capability of settling a transaction by use of a prepaid card. Any of these embodiments is in principle based on the same mechanism. As described in Japanese Patent Publication No. 103426/1994, a system for performing mutual authentication between a prepaid card and a card reader/writer through use of an electronic signature has been put forward as a security measure. An IC card equipped with an IC chip capable of reserving an electronic prepaid card or balance data has recently come into use in place of a prepaid card.

By reference to FIG. 14, next will be described an existing sales system for selling tickets for various events, public performances, or movies and allowing entry of audience into a hall. Like the previously-described settlement, this sales system also employs a prepayment method.

In the drawing, a ticketing terminal 2617 is disposed in a ticket shop 2620 and is to issue a ticket. The ticketing terminal 2617 is connected to a ticket issuer 2621 by way of a communications line 2619.

In a case where the consumer 2605 purchases a ticket for an event, a public performance, or a movie, he calls the central system 2618 of the ticket issuer 2621 and reserves a desired ticket (2624). The central system 2618 carries out booking of the requested ticket and issues a reservation number to the consumer 2605 (2625). The consumer 2605 who has received the reservation number goes to the ticket shop 2620 and asks a clerk to issue the ticket by telling her the reservation number.

The clerk performs a ticketing operation by entry of the reservation number into the ticketing terminal 2617. The ticketing terminal 2617 transmits the reservation number to the central system 2618 of the ticket issuer 2621 by way of the communications line 2619 (2627). In response to the transmission of the reservation number, the central system 2618 transmits to the ticketing terminal 2617 (2628) data pertaining to the booked ticket. The ticketing terminal 2617 prints the thus-received ticket data on a paperboard specified by the ticket issuer 2621 and outputs the thus-printed paperboard as a ticket 2616. The clerk delivers (2630) the thus-issued ticket 2616 to the consumer 2605 in exchange for cash (2629), thus terminating the sale of the ticket.

The proceeds of the sale of the ticket are transmitted to the ticket issuer 2621 after a commission for the ticket shop 2620 has been deducted from the proceeds. After a commission for the ticket issuer 2621 has been deduced from the proceeds, the remainder is paid to the promoter of the event (2634).

The consumer 2605 goes to an event hall 2623 designated for the ticket 2616 and hands the ticket 2616 over to a responsible official 2622 (2632). After having visually checked whether or not the details of the ticket 2616 are correct, the official 2622 allows the consumer 2605 to enter the hall (2633).

Next will be described a broadcast view system which allows viewing of a digital television broadcast by use of a communications satellite (CS) or a like satellite. In an existing broadcast view system, after having established contract with a broadcaster, the user receives a broadcast program and key data to be used for decoding the program through use of a dedicated receiving terminal (set-top box: STB). The thus-decoded broadcast program is displayed on a TV screen. When the user views a pay-per-view program, a charging operation is performed, whereby billing information and historic data are written into the IC card inserted in the receiving terminal. The billing information is periodically transmitted to the broadcaster by way of a communications line, and the charge is settled.

As prepaid cards have become widespread, the existing settlement system has encountered a drawback of an increase in the number of problems, such as sale or use of counterfeit cards and unauthorized billing performed by the retail outlets 2606. Instances of unauthorized billing performed by the retail outlets 2606 are divided into distinct categories; for example, charging an amount higher than the real price of a commodity product or than an amount appearing on the display of the prepaid card terminal 2601 without the user's knowledge, and charging, to the central system 2602, an amount higher than the amount deducted from the prepaid card 2600. At the time of settlement, the prepaid card terminal 2601 in principle rewrites only the balance data recorded on the prepaid card 2600. Therefore, unauthorized billing can be readily performed by modification of the prepaid card terminal 2601.

Further, in the existing settlement system, the prepaid card 2600 per se is inserted directly into the prepaid card terminal 2601. There is a chance of tampering with the information recorded on the prepaid card 2600 by modification of the prepaid card terminal 2601 or unauthorized reading of the personal information recorded on the prepaid card 2600, which would usually not be read at the time of settlement.

For these reasons, demand exists for the prepaid card terminal 2601 and a settlement system, which have a higher degree of reliability and security. For example, a physical measure must be taken against unauthorized modification of the prepaid card terminal 2601, such as sealing a housing of the prepaid card terminal 2601 in order to prevent disassembly thereof. However, such a countermeasure hinders reduction in the size or cost of the prepaid card terminal 2601.

In the existing settlement system, the consumer 2605 cannot directly ascertain the amount deducted from the prepaid card 2601. For this reason, the retail outlet 2606 must hand over, to the consumer 2605, an accounting statement having printed thereon a bill specifying the commodity price and the available balance of the prepaid card 2600. However, submission of such an accounting statement hinders an increase in sales efficiency and saving of resources.

Further, the storage capacity of the prepaid card 2601 is limited and comparatively small, and hence a large amount of information cannot stored in the prepaid card. For this reason, a prepaid card encounters difficulty in storing information of various types into a single card.

In the existing sales system, even when the ticket has already been booked online, the user has to go to the ticket shop 2630 in order to purchase and request issuance of a ticket. The sales system encounters a problem of the user being subjected to inconvenience of having to go to the ticket shop 2620 in the end. Further, in the existing sales system, the officer 2622 has to visually examine the tickets 2616 at the entrance of the event hall 2623, thus deteriorating the efficiency of examination work and involving a potential of causing an examination failure. Further, there is a fear of a consumer gaining unauthorized entry through use of a counterfeit ticket or a like ticket.

In the existing broadcast view system, payment of a charge for pay service, such as a pay-per-view broadcast program, is limited to a withdrawal from a bank account or settlement with a credit card. Further, in the existing broadcast system, billing information and history information are accumulated in a receiving terminal, and these information items are collected periodically. Therefore, there has been a necessity for ensuring a communications line for establishing communication with a server of the broadcaster.

SUMMARY OF THE INVENTION

The present invention has been conceived in view of the above-described problems of the existing systems and is aimed at providing an electronic asset utilization system for fulfilling a settlement system, a sales system, and a broadcast system, which are very convenient and reliable, through use of electronic asset having monetary values, such as electronic prepaid cards or electronic tickets. Further, the present invention is aimed at providing an electronic asset utilization method, a server for use with the electronic asset utilization system, and a recording medium having recorded thereon the electronic asset utilization method.

In order to solve the drawbacks of the background art, the present invention provides an electronic asset utilization system comprising:

a terminal which is connected to a communications network and outputs a signal for instructing transmission of a desired electronic asset on a predetermined date and time;

a server which is connected to the communications network and transmits the desired electronic asset to the terminal or to another predetermined terminal on the predetermined date and time.

Preferably, the server comprises settlement processing means for settling a charge billed to the electronic asset represented by the signal; issuance means which, after the settlement processing means has settled the charge, issues an exchange certificate verifying the user's right to receive the electronic asset, and the electronic asset corresponding to the exchange certificate; and processing means which transmits the exchange certificate issued by the issuance means to the terminal or to another predetermined terminal and transmits the electronic asset, on the predetermined date and time, to the terminal to which the exchange certificate has been transmitted.

The present invention also provides an electronic asset utilization system comprising:

a terminal which is connected to a communications network and outputs a signal for requesting purchase of a desired electronic asset; and a server which is connected to the communications network and comprises settlement processing means for settling a charge billed to the electronic asset represented by the signal, issuance means for issuing an exchange certificate capable of being exchanged for the electronic asset, and the electronic asset corresponding to the exchange certificate after the settlement processing means has settled the charge, and processing means for transmitting to the terminal or another predetermined terminal the exchange certificate issued by the issuance means, wherein, when an exchange certificate is submitted to the server by way of the communications network, the processing means transmits, to the terminal that has submitted the exchange certificate, an electronic asset corresponding to the exchange certificate.

Preferably, in a case where the terminal is a portable mobile terminal, submission of an exchange certificate to the server and/or transmission of an electronic asset to the terminal that has submitted the exchange certificate are carried out by way of a stationary terminal which can exchange data with the terminal and is disposed to be stationary.

Preferably, the exchange certificate comprises settlement information indicating that the charge billed to the electronic asset has already been settled, and status information indicating that the corresponding electronic asset has not yet been received.

Preferably, an expiration date by which the exchange certificate can be exchanged for a corresponding electronic asset is set for the exchange certificate.

Preferably, in a case where the exchange certificate has not yet been exchanged for the electronic asset corresponding to the exchange certificate even though the expiration date is at hand, the processing means sends, to the terminal to which the exchange certificate has been transmitted, a message indicating that the expiration date is very close at hand.

Preferably, in a case where the exchange certificate has not yet been exchanged for the electronic asset corresponding to the exchange certificate even when the expiration date is close at hand, the processing means issues to the terminal to which the exchange certificate has been transmitted a request for downloading the electronic asset or forcibly transmits the electronic asset corresponding to the exchange certificate to the terminal.

Preferably, the server has past-due processing means, and in the event that the exchange certificate still has not been exchanged for a corresponding electronic asset even after lapse of the expiration date of the exchange certificate, the past-due processing means sends, to the terminal to which the exchange certificate has been transmitted, a message indicating that the expiration date has passed and a request for downloading the electronic asset, or forcedly transmits the electronic asset.

Preferably, the past-due processing means issues to the terminal to which the exchange certificate has been transmitted a request for deleting or invoking the expired exchange certificate.

Preferably, upon receipt of the message or the download request from the server, the terminal indicates, on a display section, the message or details of the download request and/or details of the exchange certificate.

Preferably, upon receipt of the message or the download request from the server, the terminal issues voice notification indicating receipt of the message or the download request.

Preferably, upon receipt of a request for deleting or invoking the expired exchange certificate from the past-due processing means, the terminal deletes or invokes the exchange certificate.

The present invention further provides an electronic asset utilization system comprising:

a terminal which is connected to a communications network and outputs a signal for requesting booking of a desired electronic asset; and a server which is connected to the communications network and comprises issuance means for issuing a receipt certificate verifying booking of a desired electronic asset represented by the signal, processing means for transmitting the receipt certificate issued by the issuance means to the terminal or to another predetermined terminal, and settlement processing means for settling a charge billed to the electronic asset corresponding to the receipt certificate, wherein, in a case where the receipt certificate is submitted to the server by way of the communications network, after the settlement processing means has settled the charge billed to the electronic asset corresponding to the receipt certificate in accordance with requirements described on the receipt certificate, the issuance means issues the electronic asset corresponding to the receipt certificate and the processing means transmits the thus-issued electronic asset to the terminal that has submitted the receipt certificate.

Preferably, in a case where the terminal is a portable mobile terminal, submission of a receipt certificate to the server, settlement of the charge billed to the electronic asset, and/or transmission of the electronic asset to the terminal that has submitted the receipt certificate are carried out by way of a stationary terminal which is connected to the communications network, can transfer data with respect to the terminal, and is disposed to be stationary.

Preferably, the receipt certificate contains information about the booked electronic asset and information about the receipt certificate.

Preferably, an expiration date is set for the receipt certificate such that the electronic asset can be received on time.

Preferably, the server issues to the terminal to which the receipt certificate has been transmitted a request for deleting or invoking an expired receipt certificate.

Preferably, upon receipt of a request for deleting or invoking the expired receipt certificate from the server, the terminal deletes or invokes the receipt certificate.

Preferably, the server has retransmission processing means, and, in the event that transmission of an electronic asset, an exchange certificate, or a receipt certificate has failed, the retransmission processing means retransmits the electronic asset, the exchange certificate, or the receipt certificate.

Preferably, the server has retaining means for retaining the electronic asset, the exchange certificate, and/or the receipt certificate issued by the issuance means, and the retaining means retains the electronic asset even when the exchange certificate corresponding to the retained electronic asset has expired and retains the receipt certificate even when the retained receipt certificate has expired.

Preferably, the server has electronic asset status management means for managing the status of the electronic asset issued by the issuance means.

The present invention also provides an electronic asset utilization method using an electronic asset utilization system having a terminal connected to a communications network and a server connected to the communications network, the method comprising:

an instruction step of instructing the server to transmit a desired electronic asset on a predetermined date and time; and an electronic asset transmission step of transmitting the desired electronic asset to the terminal or to another predetermined terminal on the predetermined date and time, in accordance with the instruction.

Preferably, the electronic asset utilization method further comprises a settlement step of settling a charge billed to the electronic asset instructed in the instruction step; an issuance step of issuing an exchange certificate verifying the user's right to receive the electronic asset, and the electronic asset corresponding to the exchange certificate; and an exchange certificate transmission step of transmitting to the terminal or another predetermined terminal the exchange certificate issued in the issuance step, wherein in the electronic asset transmission step the electronic asset is transmitted to the terminal to which the exchange certificate has been transmitted.

The present invention further provides an electronic asset utilization method using an electronic asset utilization system having a terminal connected to a communications network and a server connected to the communications network, the method comprising:

a purchase request step of requesting the server to purchase a desired electronic asset;

a settlement step of settling a charge billed to the electronic asset requested in the purchase request step;

an issuance step of issuing an exchange certificate capable of being exchanged for the electronic asset, and the electronic ticket corresponding to the exchange certificate;

an exchange certificate transmission step of transmitting to the terminal or another predetermined terminal the exchange certificate issued in the issuance step;

an exchange certificate submission step in which the terminal submits the exchange certificate to the server by way of the communications network; and an electronic asset transmission step of transmitting to the terminal that has submitted the exchange certificate an electronic asset corresponding to the exchange certificate.

Preferably, in a case where the terminal is a portable mobile terminal, in the exchange certificate submission step and/or the electronic asset transmission step submission of an exchange certificate and/or transmission of the electronic asset are carried out by way of a stationary terminal which is connected to the communications network, can exchange data with the terminal, and is disposed to be stationary.

Preferably, the exchange certificate comprises settlement information indicating that the charge billed to the electronic asset has already been settled and status information indicating that the corresponding electronic asset has not yet been received.

Preferably, an expiration date by which the exchange certificate can be exchanged for a corresponding electronic asset is set for the exchange certificate.

Preferably, the electronic asset utilization method further comprises a first message transmission step of, in a case where the exchange certificate has not yet been exchanged for the electronic asset corresponding to the exchange certificate even though the expiration date is at hand, sending, to the terminal to which the exchange certificate has been transmitted, a message indicating that the expiration date is very close at hand.

Preferably, the electronic asset utilization method further comprises a download request step or a forcibly transmit step of, in a case where the exchange certificate still has not been exchanged for the electronic asset corresponding to the exchange certificate even when the expiration date is close at hand, issuing to the terminal to which the exchange certificate has been transmitted a request for downloading the electronic asset or forcibly transmitting the electronic asset corresponding to the exchange certificate to the terminal.

Preferably, the electronic asset utilization method further comprises a second message transmission step of transmitting, to the terminal to which the exchange certificate has been transmitted, a message indicating that the expiration date has passed in the event that the exchange certificate has still not been exchanged for a corresponding electronic asset even after lapse of the expiration date of the exchange certificate; a download request step of issuing, to the terminal to which the exchange certificate has been transmitted, a request for downloading the electronic asset in the event that the exchange certificate has still not been exchanged for a corresponding electronic asset even after lapse of the expiration date of the exchange certificate; or an electronic asset forced transmission step of forcedly transmitting the electronic asset to the terminal to which the exchange certificate has been transmitted in the event that the exchange certificate has still not been exchanged for a corresponding electronic asset even after lapse of the expiration date of the exchange certificate.

Preferably, the electronic asset utilization method further comprises an exchange certificate deletion/invocation request step of issuing to the terminal to which the exchange certificate has been transmitted a request for deleting or invoking the expired exchange certificate.

The present invention also provides an electronic asset utilization method using an electronic asset utilization system having a terminal connected to a communications network and a server connected to the communications network, the method comprising:

a booking request step of requesting booking of a desired electronic asset;

a receipt certificate issuance step of issuing a receipt certificate verifying booking of a desired electronic asset requested in the booking request step;

a receipt certificate transmission step of transmitting, to the terminal or another predetermined terminal, the receipt certificate issued in the receipt certificate issuance step;

a receipt certificate submission step in which the terminal submits a receipt certificate to the server by way of the communications network;

a settlement step of settling a charge billed to the electronic asset submitted in the receipt certificate submission step, in accordance with requirements described in the receipt certificate;

an electronic asset issuance step of issuing the electronic asset corresponding to the receipt certificate; and an electronic asset transmission step of transmitting to the terminal that has submitted the receipt certificate the electronic asset issued in the electronic asset issuance step.

Preferably, in a case where the terminal is a portable mobile terminal, in the receipt certificate submission step, the settlement step, and/or the electronic asset transmission step submission of a receipt certificate to the server, settlement of the charge billed to the electronic asset and/or transmission of the electronic asset are carried out by way of a stationary terminal which is connected to the communications network, can transfer data with respect to the terminal, and is disposed to be stationary.

Preferably, the receipt certificate contains information about the booked electronic asset and information about the receipt certificate.

Preferably, an expiration date is set for the receipt certificate such that the electronic asset can be received on time.

Preferably, the electronic asset utilization method further comprises a receipt certificate deletion/invocation step of issuing to the terminal to which the receipt certificate has been transmitted a request for deleting or invoking an expired receipt certificate.

Preferably, the electronic asset utilization method further comprises a retransmission step of, in the event that transmission of the issued electronic asset, exchange certificate, or receipt certificate, has failed in the electronic asset transmission step, the electronic asset forced transmission step, the exchange certificate transmission step, or the receipt certificate transmission step, retransmitting the electronic asset, the exchange certificate, or the receipt certificate.

The present invention further provides a server which is connected to a terminal by way of a communications network and which transmits a desired electronic asset to the terminal or another predetermined terminal on a predetermined date and time in accordance with an instruction signal issued from the terminal for transmitting the desired electronic asset on the predetermined date and time.

Preferably, the server further comprises settlement processing means for settling a charge billed to the electronic asset represented by the signal; issuance means which, after the settlement processing means has settled the charge, issues an exchange certificate verifying the user's right to receive the electronic asset, and the electronic asset corresponding to the exchange certificate; and processing means which transmits to the terminal or another predetermined terminal the exchange certificate issued by the issuance means and transmits the electronic asset, on the predetermined date and time, to the terminal to which the exchange certificate has been transmitted.

The present invention also provides a server connected to a terminal by way of a communications network, the server comprising:

settlement processing means for settling a charge billed to a desired electronic asset represented by the signal, in accordance with a request signal issued by the terminal for purchasing the electronic asset;

issuance means for issuing an exchange certificate capable of being exchanged for the electronic asset, and the electronic ticket corresponding to the exchange certificate after the settlement processing means has settled the charge; and processing means for transmitting the exchange certificate issued by the issuance means to the terminal or another predetermined terminal, wherein, when an exchange certificate is submitted to the server by way of the communications network, the processing means transmits, to the terminal that has submitted the exchange certificate, an electronic asset corresponding to the exchange certificate.

The present invention further provides a server connected to a terminal by way of a communications network, the server comprising:

issuance means for issuing a receipt certificate verifying booking of a desired electronic asset represented by the signal, in accordance with a request signal issued by the terminal for booking the desired electronic asset;

processing means for transmitting to the terminal or another predetermined terminal the receipt certificate issued by the issuance means; and settlement processing means for settling a charge billed to the electronic asset corresponding to the receipt certificate, wherein, in a case where the receipt certificate is submitted to the server by way of the communications network, after the settlement processing means has settled the charge billed to the electronic asset corresponding to the receipt certificate in accordance with requirements described on the receipt certificate, the issuance means issues the electronic asset corresponding to the receipt certificate and the processing means transmits the thus-issued electronic asset to the terminal that has submitted the receipt certificate.

The present invention further provides a server apparatus for use with an electronic asset utilization system comprising:

a terminal which is connected to a communications network and outputs a signal for instructing transmission of a desired electronic asset on a predetermined date and time; and a server which is connected to the communications network and transmits the desired electronic asset to the terminal or another predetermined terminal on the predetermined date and time.

Preferably, the server apparatus comprises settlement processing means for settling a charge billed to the electronic asset represented by the signal; issuance means which, after the settlement processing means has settled the charge, issues an exchange certificate verifying the user's right to receive the electronic asset, and the electronic asset corresponding to the exchange certificate; and processing means which transmits to the terminal or another predetermined terminal the exchange certificate issued by the issuance means and transmits the electronic asset, on the predetermined date and time, to the terminal to which the exchange certificate has been transmitted.

The present invention provides a server apparatus for use with an electronic asset utilization system comprising:

a terminal which is connected to a communications network and outputs a signal for requesting purchase of a desired electronic asset; and a server which is connected to the communications network and comprises settlement processing means for settling a charge billed to the electronic asset represented by the signal, issuance means for issuing an exchange certificate capable of being exchanged for the electronic asset, and the electronic ticket corresponding to the exchange certificate after the settlement processing means has settled the charge, and processing means for transmitting to the terminal or another predetermined terminal the exchange certificate issued by the issuance means, wherein, when an exchange certificate is submitted to the server by way of the communications network, the processing means transmits, to the terminal that has submitted the exchange certificate, an electronic asset corresponding to the exchange certificate.

The present invention provides a server apparatus for use with an electronic asset utilization system comprising:

a terminal which is connected to a communications network and outputs a signal for requesting booking of a desired electronic asset; and a server which is connected to the communications network and comprises issuance means for issuing a receipt certificate verifying booking of a desired electronic asset represented by the signal, processing means for transmitting to the terminal or another predetermined terminal the receipt certificate issued by the issuance means, and settlement processing means for settling a charge billed to the electronic asset corresponding to the receipt certificate, wherein, in a case where the receipt certificate is submitted to the server by way of the communications network, after the settlement processing means has settled the charge billed to the electronic asset corresponding to the receipt certificate in accordance with requirements described on the receipt certificate, the issuance means issues the electronic asset corresponding to the receipt certificate and the processing means transmits the thus-issued electronic asset to the terminal that has submitted the receipt certificate.

The present invention also provides a computer-readable recording medium on which there is recorded a program for causing a computer to execute an electronic asset utilization method of one of the previously-described modes.

Furthermore, in a case where the exchange certificate has not yet been exchanged for the electronic asset corresponding to the exchange certificate even when the expiration date is close at hand, the processing means sends, to the terminal to which the exchange certificate has been transmitted, a message indicating that the expiration date is close at hand, and in a case where the exchange certificate has not yet been exchanged for the electronic asset corresponding to the exchange certificate even when the expiration date is very close at hand, the processing means issues to the terminal to which the exchange certificate has been transmitted a request for downloading the electronic asset or forcibly transmits the electronic asset corresponding to the exchange certificate to the terminal.

Furthermore, the electronic asset utilization comprises a download request step or a forcibly transmit step of, in a case where the exchange certificate still has not been exchanged for the electronic asset corresponding to the exchange certificate even when the expiration date is close at hand, issuing to the terminal to which the exchange certificate has been transmitted a request for downloading the electronic asset or forcibly transmitting the electronic asset corresponding to the exchange certificate to the terminal.

Furthermore, in a case where the receipt certificate has not yet been exchanged for the electronic asset corresponding to the receipt certificate even when the expiration date is close at hand, the processing means sends, to the terminal to which the receipt certificate has been transmitted, a message indicating that the expiration date is close at hand.

Furthermore, in the electronic asset utilization system, the terminal displays at least one of the message and a content of the receipt certificate on a display portion, when the terminal receives the message from the server.

Furthermore, in the electronic asset utilization system, the terminal generates a sound representing a receiving of the message, when the terminal receives the message from the server.

Furthermore, the electronic asset utilization method further comprises third message sending step for sending a message indicating that the expiration date is close at hand, to the terminal to which the receipt certificate has been transmitted, in a case where the receipt certificate has not yet been exchanged for the electronic asset corresponding to the receipt certificate even when the expiration date is close at hand. In the present invention, the terminal instructs the server to transmit a desired electronic asset on a predetermined date and time by way of the communications network (in the instruction step). The server transmits the desired electronic asset to the terminal or another predetermined terminal on the predetermined date and time by way of the communications network (in the electronic asset transmission step).

The settlement processing means settles a charge billed to the electronic asset instructed by the terminal (in the settlement step). After the settlement processing means has settled the charge (in the settlement step), the issuance means issues an exchange certificate verifying the user's right to receive the electronic asset, and the electronic asset corresponding to the exchange certificate (in the issuance step). The processing means transmits to the terminal or another predetermined terminal (in the exchange certificate transmission step) the exchange certificate issued by the issuance means (in the issuance step). Further, on the predetermined date and time, the processing means transmits the electronic asset to the terminal to which the exchange certificate has been transmitted (in the electronic asset transmission step).

The terminal requests the server to purchase a desired electronic asset by way of the communications network (in the purchase request step). The settlement processing means of the server settles a charge billed to the electronic asset requested by the terminal (in the settlement step). After the settlement processing means has settled the charge (in the settlement step), the issuance means issues an exchange certificate capable of being exchanged for the electronic asset, and the electronic ticket corresponding to the exchange certificate (in the issuance step). The processing means transmits to the terminal or another predetermined terminal (in the exchange certificate transmission step) the exchange certificate issued by the issuance means (in the issuance step). In a case where the terminal submits an exchange certificate by way of the communications network (in the exchange certificate submission step), the processing means transmits, to the terminal that has submitted the exchange certificate, the electronic asset corresponding to the exchange certificate (in the electronic asset transmission step).

In the present invention, the terminal requests the server to book a desired electronic asset by way of the communications network (in the booking request step). The issuance means of the server issues a receipt certificate verifying booking of the requested electronic asset (in the receipt certificate issuance step). The processing means transmits to the terminal or another predetermined terminal (in the receipt certificate transmission step) the receipt certificate issued by the issuance means (in the receipt certificate issuance step). In a case where the receipt certificate is submitted to the server by way of the communications network (in the receipt certificate submission step), the settlement processing means settles a charge billed to the electronic asset corresponding to the receipt certificate, in accordance with requirements described on the receipt certificate (in the settlement step). After the settlement processing means has settled the charge (in the settlement step), the issuance means issues the electronic asset corresponding to the receipt certificate (in the electronic asset issuance step), and the processing means transmits (in the electronic asset transmission step) the thus-issued electronic asset (in the electronic asset issuance step) to the terminal that has submitted the receipt certificate.

As mentioned above, the server can download a corresponding electronic asset on a desired date and time or when a receipt certificate is submitted to the server. Therefore, there can be offered service of various types meeting needs of the users who use the electronic asset utilization system; for example, service in which a charge billed to an electronic asset has been settled at a time convenient to the user and the electronic asset is downloaded whenever necessary. Therefore, the present invention can provide an electronic asset utilization system capable of offering highly-convenient and flexible service, a corresponding electronic asset utilization method, a server for use with the electronic asset utilization system, and a recording medium having recorded thereon the electronic asset utilization method.

Processing to be performed by the server is distributed among a plurality of constituent elements; that is, the settlement processing means, the issuance means, and the processing means. Consequently, there can be greatly reduced a possibility that the server will become hung up as a result of concentration of great load on a single constituent element. Thus, there can be provided a highly-reliable electronic asset utilization system and server.

In a case where the terminal is a portable mobile terminal, submission of an exchange certificate to the server (in the exchange certificate submission step) and/or transmission of an electronic asset to the terminal that has submitted the exchange certificate (in the electronic asset transmission step) are carried out by way of a stationary terminal which can exchange data with the terminal and is disposed to be stationary.

In a case where the terminal is a portable mobile terminal, submission of a receipt certificate to the server (in the receipt certificate submission step), settlement of the charge billed to the electronic asset (in the settlement step), and/or transmission of the electronic asset to the terminal that has submitted the receipt certificate (in the electronic asset transmission step) are carried out by way of a stationary terminal which is connected to the communications network, can exchange data with respect to the terminal, and is disposed to be stationary.

In a case where the stationary terminal is connected to the server by way of particularly a cable (i.e., where the stationary terminal is part of a communications network), submission of an exchange certificate, transmission of an electronic asset, submission of a receipt certificate, and settlement of a charge billed to the electronic asset can be carried out more thoroughly than in the case where the stationary terminal is connected to the server by means of radio communications. In a case where exchange of data between the terminal (i.e., the mobile terminal) and the stationary terminal does not incur any communications cost, the user owning the terminal (i.e., the mobile terminal) can establish communication with the server without consideration of communications cost.

Preferably, the exchange certificate comprises settlement information indicating that the charge billed to the electronic asset has already been settled, and status information indicating that the corresponding electronic asset has not yet been received.

Preferably, an expiration date by which the exchange certificate can be exchanged for a corresponding electronic asset is set for the exchange certificate.

Preferably, in a case where the exchange certificate has not yet been exchanged for the electronic asset corresponding to the exchange certificate even though the expiration date is at hand, the processing means sends, to the terminal to which the exchange certificate has been transmitted, a message indicating that the expiration date is very close at hand (in the first message transmission step).

Preferably, in a case where the exchange certificate has not yet been exchanged for the electronic asset corresponding to the exchange certificate even when the expiration date is close at hand, the processing means issues to the terminal to which the exchange certificate has been transmitted a request for downloading the electronic asset (in the download request step) or forcibly transmits the electronic asset corresponding to the exchange certificate to the terminal.

Further, in a case where the exchange certificate has not yet been exchanged for the electronic asset corresponding to the exchange certificate even when the expiration date is close at hand, the processing means sends, to the terminal to which the exchange certificate has been transmitted, a message indicating that the expiration date is close at hand, and in a case where the exchange certificate has not yet been exchanged for the electronic asset corresponding to the exchange certificate even when the expiration date is very close at hand, the processing means issues to the terminal to which the exchange certificate has been transmitted a request for downloading the electronic asset or forcibly transmits the electronic asset corresponding to the exchange certificate to the terminal. As mentioned previously, an expiration date is set for the exchange certificate. When the expiration date of the exchange certificate is close at hand, the processing means sends a message indicating that the expiration date is at hand (in the first message transmission step). Further, the processing means sends a request for downloading an electronic asset corresponding to the exchange certificate (in the download request step) or forcibly transmits the electronic asset corresponding to the exchange certificate to the terminal, thereby preventing the user from forgetting to exchange the exchange certificate for an electronic asset. Thus, highly-convenient service can be offered to the user.

In the event that the exchange certificate still has not been exchanged for a corresponding electronic asset even after lapse of the expiration date of the exchange certificate, the past-due processing means of the server preferably sends, to the terminal to which the exchange certificate has been transmitted, a message indicating that the expiration date has passed (in the second message transmission step) and a request for downloading the electronic asset (in the download request step), or forcedly transmits the electronic asset (in the electronic asset forced transmission step).

Preferably, the past-due processing means issues to the terminal to which the exchange certificate has been transmitted a request for deleting or invoking the expired exchange certificate (in the exchange certificate deletion/invocation request step).

Preferably, upon receipt of the message or the download request from the server, the terminal indicates, on a display section, the message or details of the download request and/or details of the exchange certificate.

Preferably, upon receipt of the message or the download request from the server, the terminal issues voice notification indicating receipt of the message or the download request.

Preferably, upon receipt, from the past-due processing means, of a request for deleting or invoking the expired exchange certificate, the terminal deletes or invokes the exchange certificate.

Preferably, the receipt certificate contains information about the booked electronic asset and information about the receipt certificate.

Preferably, an expiration date is set for the receipt certificate such that the electronic asset can be received on time.

Further, in a case where the receipt certificate has not yet been exchanged for the electronic asset corresponding to the receipt certificate even when the expiration date is close at hand, the processing means sends, to the terminal to which the receipt certificate has been transmitted, a message indicating that the expiration date is close at hand. Accordingly, it is prevented the user from forgetting to exchange the exchange certificate for an electronic asset. Thus, highly-convenient service can be offered to the user.

Furthermore, the terminal displays at least one of the message and a content of the receipt certificate on a display portion, when the terminal receives the message from the server. Thus, the user having the terminal visually becomes aware the message or the content of the receipt certificate.

Moreover, the terminal generates a sound representing a receiving of the message, when the terminal receives the message from the server. Thus, the user having the terminal surely becomes aware the arraival of the message from the server.

Preferably, the server issues to the terminal to which the receipt certificate has been transmitted a request for deleting or invoking an expired receipt certificate (in the receipt certificate deletion/invocation request step).

Preferably, upon receipt, from the server, of a request for deleting or invoking the expired receipt certificate, the terminal deletes or invokes the receipt certificate.

Preferably, the server has retransmission processing means, and, in the event that transmission of an electronic asset, an exchange certificate, or a receipt certificate has failed, the retransmission processing means retransmits the electronic asset, the exchange certificate, or the receipt certificate (in the retransmission step).

Preferably, the server has retaining means for retaining the electronic asset, the exchange certificate, and/or the receipt certificate issued by the issuance means, and the retaining means retains the electronic asset even when the exchange certificate corresponding to the retained electronic asset has expired and retains the receipt certificate even when the retained receipt certificate has expired.

Preferably, the electronic asset status management means of the server manages the status of the electronic asset issued by the issuance means. Quick and efficient response to an inquiry from a customer or system maintenance can be performed, and the expiration date of an exchange certificate and that of a receipt certificate can be readily managed.

BRIEF DESCRIPTION OF THE DRAWINGS

FIG. 3 is a descriptive view showing a database of an electronic asset status management section;

FIG. 6 is a flowchart for describing processing to be performed by an exchange certificate processing section;

FIG. 9 is a block diagram showing a first example of the electronic asset utilization system according to the embodiment of the present invention;

FIG. 10 is a block diagram showing a second example of the electronic asset utilization system according to the embodiment of the present invention;

FIG. 11 is a block diagram showing a third example of the electronic asset utilization system according to the embodiment of the present invention;

FIG. 12 is a block diagram showing a fourth example of the electronic asset utilization system according to the embodiment of the present invention;

FIG. 13 is a descriptive view showing an existing settlement system of prepayment type using a prepaid card; and FIG. 14 is a descriptive view showing an existing ticket sales system.

DETAILED DESCRIPTION OF THE PREFERRED EMBODIMENTS

An electronic asset utilization system, an electronic asset utilization method, a server for use with the electronic asset utilization system, and a recording medium having recorded thereon the electronic asset utilization method according to the present invention will be described in detail hereinbelow by reference to the accompanying drawings. Although detailed descriptions are given of the electronic asset utilization system and the electronic asset utilization method of the present invention, the description of the recording medium of the present invention shall be deemed as being contained in the description of the electronic asset utilization method provided hereinbelow, since a program for carrying out the electronic asset utilization method is recorded on the recording medium. The present invention is not limited to the below embodiments or examples; the present invention can be carried out in various forms falling within the scope of the invention.

Further, a term "electronic asset utilization system" comprehensively encompasses the concept of the electronic asset utilization system, that of the electronic asset utilization method, and that of the recording medium. The electronic asset utilization system will be explained as an electronic asset purchasing system for purchasing an electronic asset by way of a communications network and an electronic asset use system for using an electronic asset. Here, a term "electronic asset" comprehensively encompasses an electronic prepaid card having a monetary value, an electronic ticket to which a ticket of an event or movie is converted, and an electronic pay-per-view broadcast ticket to which a ticket for use in viewing a pay-per-view broadcast program is converted.

Figure 1:
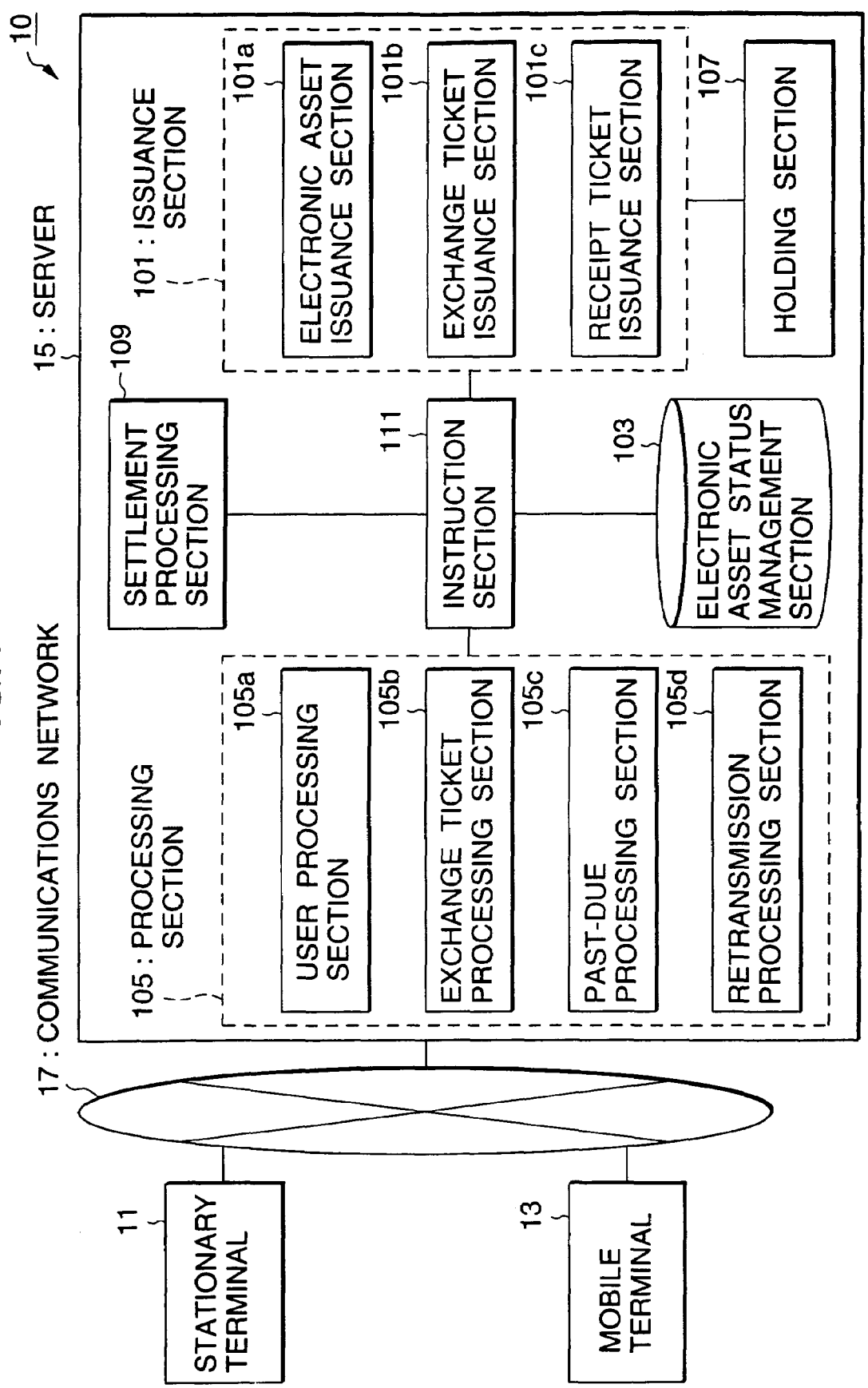
FIG. 1 is a block diagram showing an electronic asset utilization system according to one embodiment of the present invention.

FIG. 1 is a block diagram showing an electronic asset utilization system according to a first embodiment of the present invention.

As shown in the drawings, the electronic asset utilization system 10 of the present embodiment comprises a stationary terminal 11, a mobile terminal 13, and a server 15. These elements are connected to a communications network which is constituted of a wireless or wired public telephone line, a leased line, or a satellite communications line. The electronic asset utilization system 10 handles the electronic asset with use of a exchange certificate or a receipt certificate as described hereafter.

The stationary terminal 11 corresponds to a personal computer (PC), a set-top box (STB), or an Internet TV set, which are disposed at a user's home, a friend's house, or a hotel room; a point-of-sales (POS) terminal or a vending machine disposed at a ticket shop or a convenience store; or a ticket examination system disposed at the entrance gate of an event hall or a like facility. Here, STB is an add-on device for use with, for example, a television set disposed in the home, and has a capability of decompressing the compressed video data transmitted over the communications network, as well as a simple personal-computer function of making the TV useful for many purposes.

The stationary terminal 11 is connected to the communications network by way of a cable or by means of a radio communications device, such as a personal handy phone system (PHS) or a like system. Here, the stationary terminal 11 is not necessarily connected to the communications network at all times and has communication means capable of communicating electronic assets, such as an electronic prepaid card, an electronic ticket, a pay-per-view broadcast ticket, or a like asset, with the mobile terminal 13 through use of infrared-ray communications (IrDA) or short-range radio communications (for example, Bluetooth) or means capable of reading data from or writing data on a transportable compact memory card or a like device.

The mobile terminal 13 corresponds to a portable cellular phone; a handy terminal such as a personal digital assistance (PDA), or a notebook computer, or a like device; or a portable terminal connected to a communications network by way of a cable or wireless communications. The mobile terminal 13 has communications means capable of conducting communications by means of infrared-ray communications (IrDA) or short-range radio communications (e.g., Bluetooth) or means capable of reading data from or writing data on a portable compact memory card or a like device.

A display section of the stationary terminal 11 for indicating the contents of an electronic asset is greater in area than a display section of the mobile terminal 13. In a word, the display section of the stationary terminal 11 has a large screen, and the display section of the mobile terminal 13 has a small screen. Further, memory or a hard disk drive of the stationary terminal 11 for reserving electronic asset is greater in storage capacity than memory of the mobile terminal 13. Further, the stationary terminal 11 has a low probability of causing failures such as communications errors or a like problem than does the mobile terminal 13 and hence is considered highly reliable.

The stationary terminal 11 disposed in, for example, the home, is shared among family members. In contrast, the stationary terminal disposed in a shop, such as a convenience store or a ticket shop, is shared among a great number of unspecified people. In contrast, the mobile terminal 13 is a piece of personal property.

Further, the server 15 comprises an issuance section 100 (corresponding to issuance means), an electronic asset status management section 103 (corresponding to electronic asset status management means), a processing section 105 (corresponding to processing means), a retaining section 107 (corresponding to retaining means), a settlement processing section 109 (corresponding to settlement processing means), and an instruction section 111. The server 15 is connected to the stationary terminal 11 and the mobile terminal 13.

The server 15 receives an order for an electronic asset from the stationary terminal 11 or the mobile terminal 13, settles a charge for the thus-ordered electronic asset, issues an electronic asset and an exchange or receipt certificate to be described later and downloads the electronic asset and the exchange or receipt certificate, and holds the thus-issued electronic asset and the exchange or receipt certificate.

The exchange certificate verifies a right to receive an electronic asset, and at the time of receipt of an exchange certificate the user must pay a charge for the electronic asset which the user has received. Consequently, when the user submits the exchange certificate to the server 15 in exchange for the electronic asset, settlement of the charge billed to the electronic asset is unnecessary. The exchange certificate contains status information representing that the electronic asset has not yet been transmitted, as well as settlement information representing that the bill charged to the electronic asset has already been settled. Further, an expiration date is set for the exchange certificate. When the exchange certificate is downloaded, an electronic signature of the service provider is appended to the overall exchange certificate.

The mobile terminal 13, which has received the exchange certificate, verifies the appended electronic signature. If the electronic signature is valid, the mobile terminal 13 sends, to the server 15, a message responding to the exchange certificate request and an acknowledgment indicating that the exchange certificate has been verified (hereinafter referred to simply as an "exchange certificate verification ACK"). This exchange certificate verification ACK contains a message ID indicating that the acknowledgement is an exchange certificate verification ACK, as well as data encrypted by subjecting the exchange certificate to hashing computation.

The receipt certificate certifies that a booking for an electronic asset has been received. In contrast with the case of an exchange certificate, the user does not need to settle a charge billed to the thus-ordered electronic ticket. Therefore, the user must settle the charge billed to the electronic ticket before submitting the receipt certificate to the server 15 in exchange for the electronic asset. An expiration date is set even for the receipt certificate.

Figure 2A:
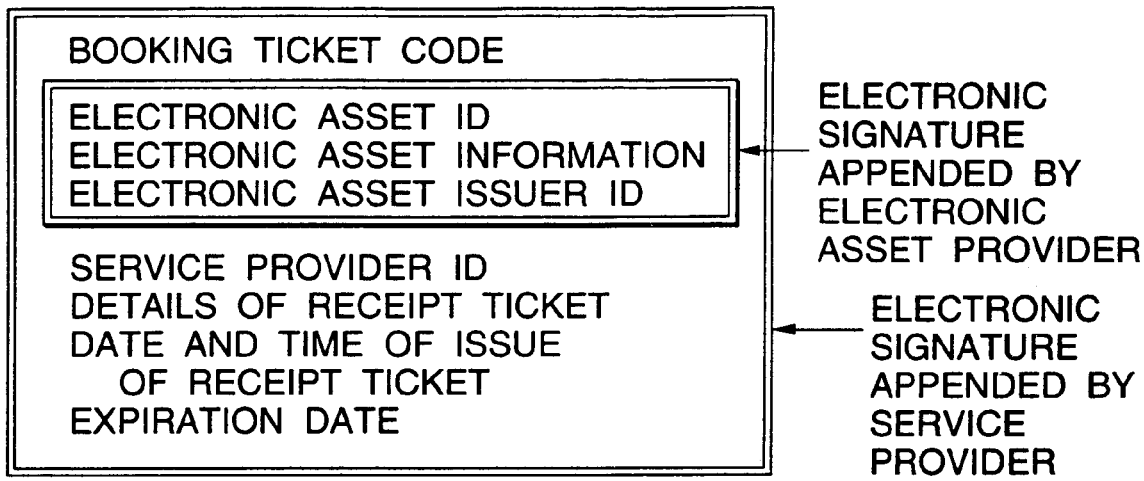
FIG. 2 is a descriptive view showing the data structure of a receipt certificate.

As shown in FIG. 2A, the receipt certificate, for example, comprises information pertaining to an electronic asset; i.e., an "electronic asset ID," "electronic asset information," and an electronic asset issuer ID"; and information pertaining to a receipt certificate, i.e., a "receipt certificate code," a "service provider ID," "details of the receipt certificate," the "date and time of issue of the receipt certificate," and an "expiration date." An electronic signature of the electronic asset provider is appended to the information elements representing the "electronic asset ID," the "electronic asset information," and the electronic asset issuer ID." The electronic signature of the service provider is appended to the receipt certificate.

Figure 2B:
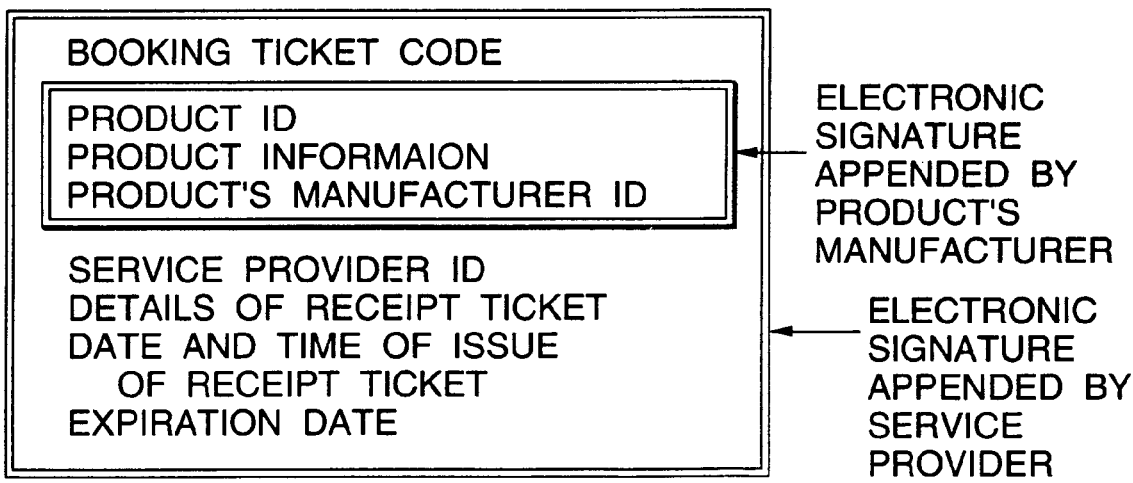
Figure 2C:
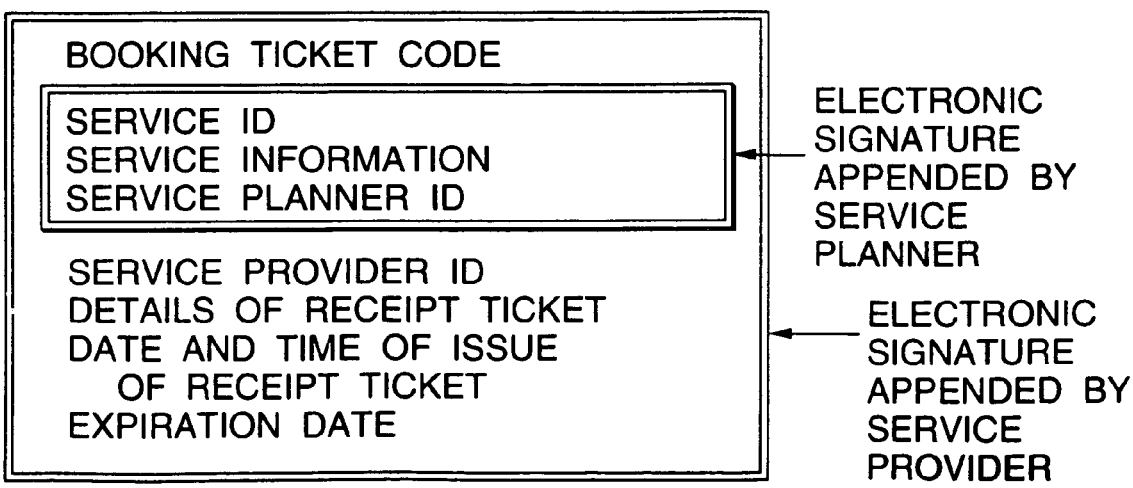

Information representing the "details of the receipt certificate" indicates receiving conditions (or requirements), such as an "This receipt certificate is an order ticket concerning the above-identified ticket. A seat is reserved until an expiration date," "100 persons can purchase tickets by lottery," or "if we receive applications from 100 persons by a certain date, this commodity product will be manufactured and sold to the applicants." As shown in FIGS. 2B and 2C, even in a case where the receipt certificate relates not to an electronic asset but to a commodity product or service, the information has the same structure.

The respective constituent elements of the server 15 will now be described.

The issuance section 101 comprises an electronic asset issuance section 101a, an exchange certificate issuance section 101b, and a receipt certificate issuance section 101c. The electronic asset issuance section 101a issues the electronic asset ordered by the user, and the exchange certificate issuance section 101b issues an exchange certificate corresponding to the electronic asset that has been ordered by the user. The receipt certificate issuance section 101c issues a receipt certificate corresponding to the electronic asset that has been booked by the user.

The issuance section 101 performs management of information pertaining to the electronic asset issuer; control of communications with an electronic asset issuance system (not shown); authentication of the electronic asset issuer; encryption of transmission data to be transmitted to the electronic asset issuance system; decryption of the data received from the electronic asset issuance system; and verification of the validity of the data transmitted from the electronic asset issuance system.

The electronic asset status management section 103 corresponds to means for managing the status of an electronic asset issued by the electronic asset issuance section 101a. As shown in FIG. 3, with regard to each of electronic assets, the electronic asset status management section 103 reserves a database 300 comprising data sets pertaining to an "electronic asset ID (300a)," the "date and time of issue of the electronic asset (300b)," an "electronic asset expiration date (300c)," data indicating "presence or absence of an exchange certificate (300d)," an "exchange certificate expiration date (300e)," and the "status of the electronic asset (300f)." Data pertaining to status, such as "completion of a refund," "awaiting a user's request for exchange," "awaiting downloading of date pertaining to a designated expiration date," "completion of downloading of an electronic asset," "processing pertaining to an expired exchange certificate in process," "retransmission in process," "expiration of the term of an electronic asset," "forced retransmission in process," "completion of a forced downloading operation," or a like status, are entered into the item (300f) representing the status of an electronic asset.

The processing section 105 comprises a user processing section 105a, an exchange certificate processing section 105b, a past-due processing section 105c (corresponding to past-due processing means), and a retransmission processing section 105d (corresponding to retransmission processing means). The exchange certificate issued by the exchange certificate issuance section 101b or the receipt certificate issued by the receipt certificate issuance section 101c is downloaded by the processing section 105 to the mobile terminal 13.

The user processing section 105a belonging to the processing section 105 performs management of information pertaining to the owner (i.e., user) of the mobile terminal 13; control of communications with the mobile terminal 13; verification of the user; encryption of data to be transmitted to the mobile terminal 13; decryption of data which have been received from the mobile terminal 13; verification of validity of the data transmitted from the mobile terminal 13; remote access to the mobile terminal 13; and updating or backing up data by means of remote processing of the mobile terminal 13.

Figure 4:
FIG. 4 is a descriptive view showing a screen which appears on a display section of a mobile terminal when a message is transmitted to the mobile terminal.

With regard to a valid exchange certificate, the exchange certificate processing section 105b belonging to the processing section 105 transmits, on the date set before the expiration date of the exchange certificate, a message or a download request to the mobile terminal 13 that has downloaded the exchange certificate. Further, the processing section 105b requests transfer, to the past-due processing section 105c, of an electronic asset corresponding to an expired exchange certificate. For example, in a case where a certain user holds an exchange certificate of an electronic ticket regarding a Christmas concert to be held on Christmas day (Dec. 25th) of the year 2000 and where, as of Dec. 23rd of the 2000, the user has not yet exchanged the exchange certificate for the electronic ticket, the exchange certificate processing section 105b transmits, to the mobile terminal 13 owned by the user, a message indicating that "the expiration date on which the exchange certificate can be exchanged for an electronic ticket is close at hand. Please exchange the exchange certificate for the electronic ticket immediately. A refund cannot be given for an expired ticket." As shown in FIG. 4, details of the electronic ticket ("Christmas concert" and "Date: Dec. 25th, 2000") and the received message appear on a display section of the mobile terminal 13. The exchange certificate processing section 105b may transmit such a message via e-mail or telephone. The exchange certificate processing section 105b may transmits a massage regarding the receipt certificate such as "the receipt certificate will be expired soon".

Figure 5A:
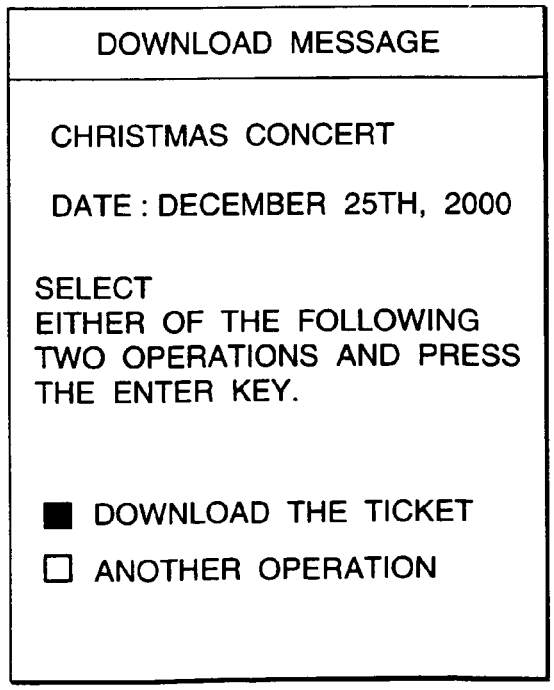
FIG. 5 is a descriptive view showing a screen which appears on the display section of the mobile terminal when a download request is transmitted to the mobile terminal.
Figure 5B:
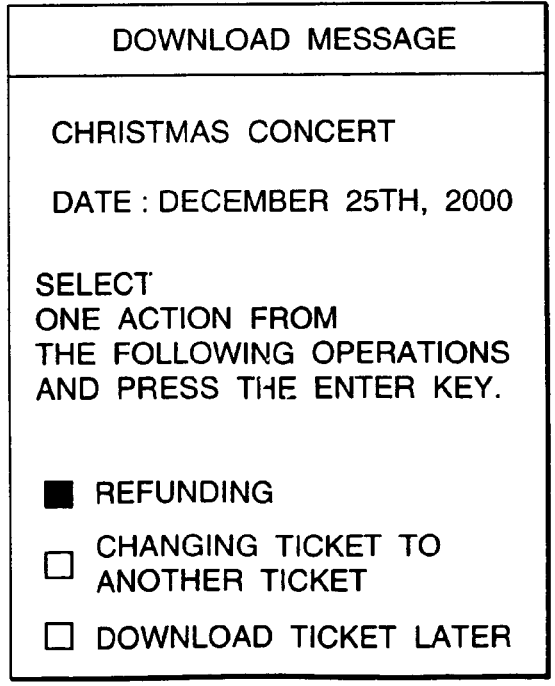

In a case where, as of Dec. 24th of the 2000, the user has still not exchanged the exchange certificate for the electronic ticket even after transmission of the foregoing message, the exchange certificate processing section 105 sends a download request to the mobile terminal 13. As shown in FIG. 5A, the details of the electronic ticket appear on the display section of the mobile terminal 13, thus prompting the user to download the thus-displayed electronic ticket or perform another processing operation. If the user selects downloading of the electronic ticket, the mobile terminal 13 acquires the electronic ticket by submission of the exchange certificate to the server 15. In contrast, if the user selects another processing operation, the display section of the mobile terminal 13 is switched to a screen for selecting one action from among a refund of the ordered electronic ticket, changing of the electronic ticket to another electronic ticket, or downloading of the electronic ticket later, as shown in FIG. 5B.

When receiving a message or a download request, the mobile terminal 13 may inform the user of receipt of the message by voice notification. Further, even when no message or download request is transmitted from the server 15, the mobile terminal 13 may perform indication of a screen display and/or voice notification informing the user that an expiration date is near at hand, such as that shown in FIG. 5A, or indication of a screen display and/or voice notification prompting the user to download the electronic ticket, before an expiration date.

In a case where the status (300f) of a certain electronic asset is "awaiting a user's request for exchange" and where the user requests exchange, for the electronic asset, the exchange certificate corresponding to the electronic asset by means of submission of the exchange certificate to the server 15, the exchange certificate processing section 105b downloads to the mobile terminal 13 carried by the user the electronic asset corresponding to the thus-submitted exchange certificate. At this time, the electronic asset may be downloaded by way of the stationary terminal 11. Alternatively, the electronic asset, which has been downloaded to the mobile terminal 13, may be transferred to the stationary terminal 11, such as a personal computer or a like device, by means of infrared-ray communications (IrDA) or short-range radio communications (Bluetooth), or through use of a portable compact memory card.

In a case where the status (300f) of a certain electronic asset is "awaiting downloading of date pertaining to a designated expiration date," on a previously-designated expiration date the exchange certificate processing section 105b downloads an electronic asset corresponding to the exchange certificate to the mobile terminal 13 that has downloaded the exchange certificate. Here, the expiration date is stored in the database 300 belonging to the electronic asset status management section 103.

By reference to FIG. 6, next will be described processing to be performed by the exchange certificate processing section 105b with regard to a certain valid exchange certificate or a certain electronic asset corresponding to the exchange certificate. FIG. 6 is a flowchart for describing the processing to be performed by the exchange certificate processing section 105b. The status of an electronic asset to be processed according to the flowchart is assumed to correspond to "awaiting a user's request for exchange" or "awaiting downloading of date pertaining to a designated expiration date."

In FIG. 6, in step S101 a determination is made as to whether or not the exchange certificate is valid. If the exchange certificate has passed the expiration date (when NO is selected in step S101), processing proceeds to step S103. In contrast, if the exchange certificate still remains valid (when YES is selected in step S101), processing proceeds to step S105. After in step S103 the processing pertaining to the electronic asset corresponding to the exchange certificate has been handed over to the past-due processing section 105c, processing proceeds to step S117, where a completion acknowledgement is sent to the instruction section 111 and processing is terminated. Here, the instruction section 111 that has received the completion acknowledgement rewrites, to "processing pertaining to an expired exchange certificate in process," the status (300f) of the electronic asset corresponding to the exchange certificate which has been recorded in the database 300.

In step S105, a determination is made as to whether or not the status of the electronic asset corresponds to "awaiting a user's request for exchange," by reference to a database of the electronic status management section 103. If the status corresponds to "awaiting a user's request for exchange" (i.e., when YES is selected in step S105), processing is terminated. In contrast, if the status does not correspond to "awaiting a user's request for exchange" (i.e., when NO is selected in step S105), processing proceeds to step S107.

In step S107, a determination is made as to whether or not the status of the electronic asset corresponds to "awaiting downloading of data pertaining to a designated expiration date," by reference to the database of the electronic status management section 103. If the status corresponds to "awaiting downloading of data pertaining to a designated expiration date" (i.e., when YES is selected in step S107), processing proceeds to step S109. In contrast, if the status does not correspond to "awaiting downloading of data pertaining to a designated expiration date" (i.e., when NO is selected in step S107), processing is terminated.

In step S109, a determination is made as to whether or not the date on which the processing is performed corresponds to a designated date of the electronic asset on which a download request is to be transmitted. If the date does not match the designated date (when NO is selected in step S109), processing is terminated. In contrast, if the date matches the designated date (when YES is selected in step S109), processing proceeds to step S111, where the electronic asset is downloaded. Next, in step S113 a determination is made as to whether or not downloading of the electronic asset in step S111 was successful. If the downloading of the electronic asset has failed (when NO is selected in step S111), processing proceeds to step 115. In contrast, if downloading has been successful (when YES is selected in step S111), processing proceeds to step S117, where a completion acknowledgment is sent to the instruction section 111 and processing is terminated. The instruction section 111 that has received the completion acknowledgement rewrites, to "completion of downloading of an electronic asset," the status (300f) of the electronic asset recorded in the database 300.

In step S115, after the processing pertaining to the electronic asset has been handed over to the retransmission processing section 105d, processing proceeds to step S117, where a completion acknowledgement is sent to the instruction section 111 and processing is terminated. The instruction section 111 that has received the completion acknowledgment rewrites, to "retransmission processing," the status (300f) of the electronic asset recorded in the database 300.

In a case where the date on which transmission of a message or transmission of a download request is to be effected is set in the database 300, the flowchart includes a step of determining whether to effect "transmission of a message" or "transmission of a download request" and a step of "transmitting a message" or a step of "transmitting a download request."

The past-due processing section 105c of the processing section 105 transmits a download request to the mobile terminal 13 that has downloaded the exchange certificate; transmits, in relation to the expired exchange certificate, a message indicating that the exchange certificate has passed the expiration date; and forcedly downloads a corresponding electronic asset to the mobile terminal 13. The past-due processing section 105c sends, to the mobile terminal 13 that has downloaded the exchange certificate or the receipt certificate, a signal for requesting deletion of an expired exchange certificate or receipt certificate and a signal for requesting revocation of the exchange certificate. At this time, the mobile terminal 13 or the user owning the mobile terminal 13 automatically or manually deletes or revokes the instructed exchange certificate or receipt certificate.

Figure 7:
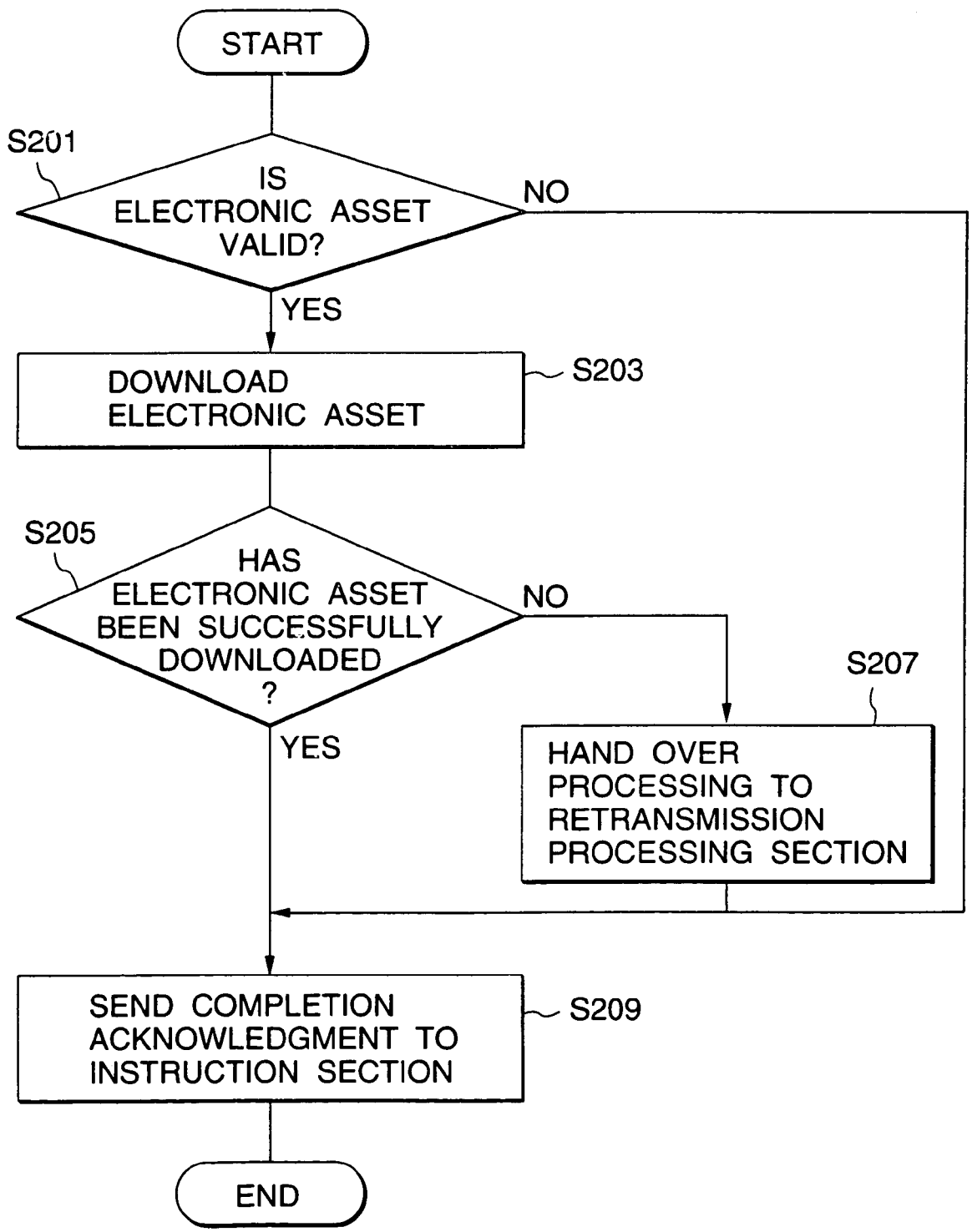
FIG. 7 is a flowchart for describing processing to be performed by a past-due processing section.

By reference to FIG. 7, next will be described processing to be performed by the past-due processing section 105c with regard to an electronic asset corresponding to an invalid exchange certificate. FIG. 7 shows a flowchart for describing processing to be performed by the past-due processing section 105c. Here, the status of an electronic asset to be processed according to the flowchart is assumed to correspond to "processing pertaining to an expired exchange certificate in process."

As shown in FIG. 7, in step S201 a determination is made as to whether or not the electronic asset is valid. If the electronic asset is valid (when YES is selected in S201), processing proceeds to step S203. In contrast, if the electronic asset is invalid (when NO is selected in S201), processing proceeds to step S209, where a completion acknowledgment is set to the instruction 111 and processing is terminated. The instruction section 111 that has received the completion acknowledgment rewrites, to "expired electronic asset," the status (300f) of the electronic asset recorded in the database 300.

In step S203 the electronic asset is forcedly downloaded, and processing proceeds to step S205. In step S205 a determination is made as to whether or not the forced downloading of the electronic asset performed in step S203 has been successful. If the downloading of the electronic asset has failed (when NO is selected in step S203), processing proceeds to step S207. In contrast, if the downloading has been successful (when YES is selected in step S203), processing proceeds to step S209, where a completion acknowledgement is sent to the instruction section 111. Here, the instruction section 111 that has received the completion acknowledgment rewrites, to "completion of a forced downloading operation," the status (300f) of the electronic asset recorded in the database 300.

After in step S207 the processing pertaining to the electronic asset has been handed over to the retransmission processing section 105d, processing proceeds to step S209, where a completion acknowledgment is sent to the instruction section 111 and processing is terminated. Here, the instruction section 111 that has received the completion acknowledgment rewrites, to "forced retransmission in process," the status (300f) of the electronic asset recorded in the database 300.

In the event that the exchange certificate processing section 105b has failed to download an electronic asset or the past-due processing section 105c has failed to forcedly download the electronic asset, the retransmission processing section 105d of the processing section 105 again downloads an electronic asset. Further, the retransmission processing section 105d performs a retransmission operation even when transmission of a message or download request has failed. Further, the retransmission processing section 105d performs a retransmission operation even in the event of a failure arising in transmission of a signal for requesting deletion or invocation of an expired exchange certificate or receipt certificate. The retransmission operation may be performed only a predetermined number of times or until transmission is successful.

Figure 8:
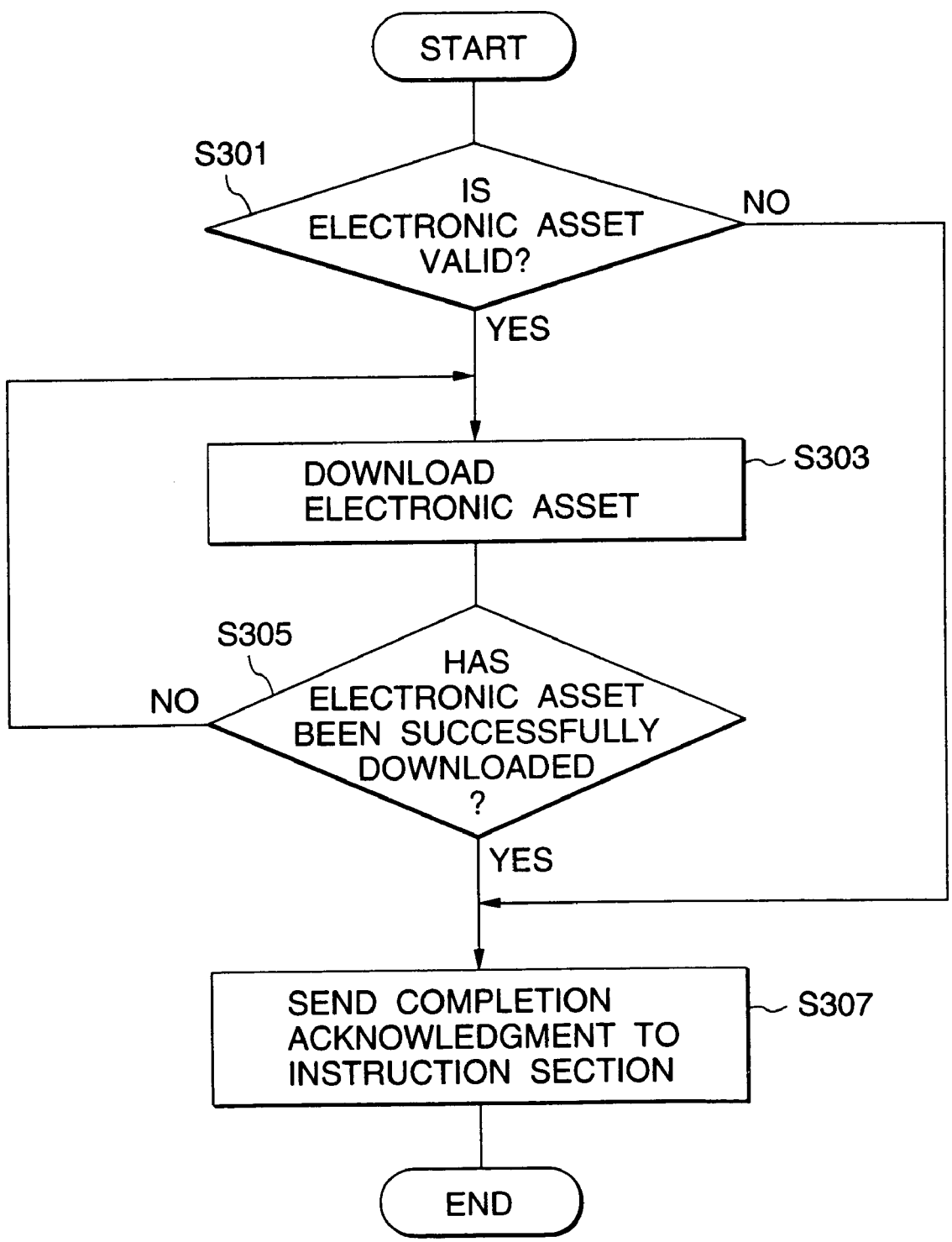
FIG. 8 is a flowchart for describing processing to be performed by a retransmission processing section.

By reference to FIG. 8, next will be described processing to be performed by the retransmission processing section 105d with regard to an electronic asset whose downloading has failed once. FIG. 8 shows a flowchart for describing processing to be performed by the retransmission processing section 105d. Here, the status of the electronic asset to be processed according to the flowchart is assumed to correspond to "retransmission in process" or "forced retransmission in process," and retransmission operation is assumed to continue until retransmission operation is successful.

In FIG. 8, in step S301 a determination is made as to whether or not an electronic asset is valid. If the electronic asset is valid (when YES is selected in step S301), processing proceeds to step S303. In contrast, if the electronic asset is invalid (when NO is selected in step S301), processing proceeds to step S307, where a completion acknowledgment is sent to the instruction section 111 and processing is terminated. Here, the instruction section 111 that has received the completion acknowledgment rewrites, to "expiration of the term of an electronic asset," the status (300f) of the electronic asset recorded in the database 300.

In step S303 the electronic asset is forced downloaded, and processing proceeds to step S305. In step S305 a determination is made as to whether or not the forced downloading of the electronic asset that has been performed in step S303 has been successful. If the downloading of the electronic asset has failed (when NO is selected in step S303), processing returns to step S303. In contrast, if the downloading has been successful (when YES is selected in step S303), processing proceeds to step S307, where a completion acknowledgment is sent to the instruction section 111 and processing is terminated. Here, the instruction section 111 that has received the completion acknowledgment rewrites, to "completion of a forced downloading operation," the status (300f) of the electronic asset recorded in the database 300.

The retaining section 107 retains the electronic asset issued by the electronic asset issuance section 101a, the exchange certificate issued by the exchange certificate issuance section 101b, and the receipt certificate issued by the receipt certificate issuance section 10c. Further, the retaining section 107 retains an electronic asset corresponding to an expired exchange certificate until the electronic asset expires, as well as an expired receipt certificate. Further, the retaining section 107 may be embodied by means of another server.

The settlement processing section 109 settles a charge billed to an ordered electronic asset and effects management of information about a settlement processing institution where a settlement processing system (not shown) is disposed, control of communications with the settlement processing system, authentication of the settlement processing institution, encryption of data to be transmitted to the settlement processing system, decryption of the data received from the settlement processing system, and verification of validity of the data transmitted from the settlement processing system.

The instruction section 111 manages the processing section 105, the issuance section 101, an electronic asset status management section 103, the retaining section 107, and the settlement processing section 109 and effects overall control of the processing to be performed by the server 15. Particularly, the instruction section 111 processes a request from each of the individual constituent elements constituting the server 15 and sends to each of the constituent elements an instruction for prompting processing.

Examples of the electronic asset utilization system 10 according to the present embodiment having the foregoing constituent elements will now be described.

FIRST EXAMPLE

FIG. 9 is a block diagram showing a first example of the electronic asset utilization system according to the present embodiment. In the first example, a user (user B) owns a mobile terminal 13, and a stationary terminal 11 corresponds to a point-of-sales (POS) terminal disposed at a shop, such as a ticket shop or a convenience store. The present example is based on the assumption that user B will use the mobile terminal 13. Further, a server 15 handles an electronic ticket as an electronic asset. Here, a single person manages both the server 15 and the stationary terminal 11.

More specifically, the present example is based on the following assumption: when user B places an order with the server 15 for an electronic ticket, the server 15 downloads an exchange certificate corresponding to the electronic ticket to the mobile terminal 13. When user B submits the exchange certificate to the server 15 by way of the stationary terminal 11, the electronic ticket corresponding to the exchange certificate is downloaded to the mobile terminal 13 by way of the stationary terminal 11.

First, user B accesses the server 15 in the field through use of the mobile terminal 13, thereby placing an order for a desired electronic ticket. In response to the order, the server 15 settles a charge billed to the electronic ticket by way of the mobile terminal 13. In a case where the bill has been settled properly, the exchange certificate corresponding to the ordered electronic ticket is downloaded to the mobile terminal 13. At this time, the server 15 stores, into a retaining section 107 thereof, the ordered electronic ticket and the exchange certificate corresponding to the electronic ticket and records, into the database of the electronic asset status management section 103, data pertaining to an electronic asset ID, the date and time of issue of the electronic ticket, an expiration date of the electronic ticket, the presence or absence of the exchange certificate, and the status of the electronic asset.

Next, user B brings, to the shop where the stationary terminal 11 is disposed, his mobile terminal 13 having the exchange certificate stored therein and submits the exchange certificate to the stationary terminal 11 through use of infrared-ray communications (IrDA) or short-range radio communications (Bluetooth). The stationary terminal 11 submits the exchange certificate to the server 15 via a communications network 17. The server 15 then verifies the exchange certificate submitted by way of the stationary terminal 11 and specifies an electronic ticket corresponding to the exchange certificate. Subsequently, the server 15 downloads the thus-specified electronic ticket to the stationary terminal 11. The stationary terminal 11, which has acquired the electronic ticket, transmits the electronic ticket to the mobile terminal 13 through use of infrared-ray communications (IrDA) or short-range radio communications (Bluetooth).

When the server 15 downloads the exchange certificate to the mobile terminal 13, the exchange certificate may be encrypted through use of a public key of user B. Further, when the exchange certificate is submitted to the stationary terminal 11, the exchange certificate may be encrypted through use of a public key of the server 15. Moreover, when the server 15 downloads the electronic ticket to the stationary terminal 11, the electronic ticket may be encrypted through use of the public key of user B. As a matter of course, the mobile terminal 13 and the server 15 must have their corresponding secret keys.

SECOND EXAMPLE

FIG. 10 is a block diagram showing a second example of the electronic asset utilization system according to the present embodiment. In contrast with the case of the first example (shown in FIG. 9), in the second example the exchange certificate issued by the server 15 is downloaded not to the mobile terminal 13 but to another mobile terminal 13' owned by another person, such as a friend of user B (hereinafter referred to as "user D"). In the present example, when user B places an order for a desired electronic ticket, he must instruct the mobile terminal 13' to download the exchange certificate, by transmission of a terminal ID of the mobile terminal 13'. Since the exchange certificate is to be downloaded to the mobile terminal 13', naturally user D would bring his mobile terminal 13' to the shop where the stationary terminal 11 is disposed, in order to exchange the exchange certificate for the electronic ticket.

When the server 15 downloads the exchange certificate to the mobile terminal 13', the exchange certificate may be encrypted through use of a public key of user D. Further, when the exchange certificate is submitted to the stationary terminal 11 from the mobile terminal 13', the exchange certificate may be encrypted through use of the public key of the server 15. Moreover, when the serer 15 downloads an electronic ticket to the stationary terminal 11, the electronic ticket may be encrypted through use of the public key of user D. At this time, as a matter of course, the mobile terminal 13' and the server 15 must have their corresponding secret keys.

THIRD EXAMPLE

FIG. 11 is a block diagram showing a third example of the electronic asset utilization system according to the present embodiment. In contrast with the first example (see FIG. 9), the third example is based on the assumption that, when user B issues a request to the server 15 for booking an electronic ticket, the server 15 downloads to the mobile terminal 13 a receipt certificate corresponding to the electronic ticket. When user B submits the receipt certificate to the server 15 via the stationary terminal 11, an electronic ticket corresponding to the receipt certificate is downloaded to the mobile terminal 13 by way of the stationary terminal 11.

First, user B accesses the server 15 in the field through use of the mobile terminal 13, thereby placing an order for booking a desired electronic ticket. In response to the order, the server 15 downloads, to the mobile terminal 13, a receipt certificate pertaining to the booking of the electronic ticket. At this time, the server 15 stores the receipt certificate into the retaining section 107 of the server 15.

Next, user B brings, to the shop where the stationary terminal 11 is disposed, his mobile terminal 13 having the receipt certificate stored therein and submits the receipt certificate to the stationary terminal 11 through use of infrared-ray communications (IrDA) or short-range radio communications (Bluetooth). The stationary terminal 11 submits the receipt certificate to the server 15 via a communications network 17. The server 15 then verifies the receipt certificate submitted by way of the stationary terminal 11 and settles, by way of the stationary terminal 11, a charge billed to an electronic ticket corresponding to the receipt certificate. If the charge is settled properly, the electronic ticket is downloaded to the stationary terminal 11. The stationary terminal 11, which has acquired the electronic ticket, transmits the electronic ticket to the mobile terminal 13 through use of infrared-ray communications (IrDA) or short-range radio communications (Bluetooth).

The settlement operation conducted between the server 15 and the mobile terminal 13 may be conducted directly without involvement of the stationary terminal 11. Further, when the server 15 downloads the receipt certificate to the mobile terminal 13, the receipt certificate may be encrypted through use of the public key of user B. Moreover, when the receipt certificate is submitted to the stationary terminal 11 from the mobile terminal 13, the receipt certificate may be encrypted through use of the public key of the server 15. Further, when the server 15 downloads an electronic ticket to the stationary terminal 11, the electronic ticket may be encrypted through use of the public key of user B. As a matter of fact, the mobile terminal 13 and the server 15 must own their corresponding secret keys.

FOURTH EXAMPLE

FIG. 12 is a block diagram showing a fourth example of the electronic asset utilization system according to the present embodiment. In contrast with the case of the third example (see FIG. 11), in the present example the receipt certificate issued by the server 15 is downloaded not to the mobile terminal 13 but to the mobile terminal 13' owned by another person, such as user D who is a friend of user B. Accordingly, in the present example, when user B requests booking of a desired electronic ticket, he must instruct the mobile terminal 13' to download a receipt certificate, by transmission of the terminal ID of the mobile terminal 13'. Since the exchange certificate is to be downloaded to the mobile terminal 13', naturally user D would bring his mobile terminal 13' to the shop where the stationary terminal 11 is disposed, in order to exchange the receipt certificate for the electronic ticket.

When the server 15 downloads the receipt certificate to the mobile terminal 13', the receipt certificate may be encrypted through use of the public key of user D. Further, when the receipt certificate is submitted to the stationary terminal 11 from the mobile terminal 13', the receipt certificate may be encrypted through use of the public key of the server 15. Moreover, when the server 15 downloads an electronic ticket to the stationary terminal 11, the electronic ticket may be encrypted through use of the public key of user D. At this time, as a matter of course, the mobile terminal 13' and the server 15 must have their corresponding secret keys.

As has been described above, in the present invention, since an electronic asset can be transmitted to the user by way of a communications network through use of an exchange or receipt certificate capable of being exchanged for an electronic asset, highly-convenient and more flexible service can be offered.

Particularly, the user can download a corresponding electronic asset on a desired date and time or upon submission of a receipt certificate to the server. Therefore, there can be offered services of various types meeting needs of the users who use the electronic asset utilization system; for example, service in which a charge billed to an electronic asset has been settled at a time convenient to the user and the electronic asset is downloaded whenever necessary. When an electronic asset is provided as a gift to another person such as a friend or lover, in place of an electronic asset per se an exchange certificate or receipt is transmitted to a mobile terminal of the recipient. Even when the user changes an electronic asset to another electronic asset or obtains a refund for the electronic asset, the electronic asset utilization system can readily cope with such a situation. Further, the exchange certificate or the receipt certificate can be transmitted to the mobile terminal 13' owned by another person such as the friend or lover. That is, the exchange certificate or the receipt certificate can be transferred to another.

An exchange certificate is issued after a charge billed to an electronic asset corresponding to the exchange certificate has been settled, and a receipt certificate is issued without involvement of settlement of an electronic asset corresponding to the receipt certificate. If the exchange certificate has expired, a refund must be given for the exchange certificate, thus involving a laborious refunding operation and management of an expiration date. However, in a case where the receipt certificate has expired, there is no necessity for providing a refund for the receipt certificate, thus enabling easy cancellation and management of a receipt certificate.

Processing to be performed by the processing section 105 is distributed among a plurality of constituent elements; that is, the user processing section 105*a*, the exchange certificate processing section 105*b*, the past-due processing section 105*c*, and the retransmission processing section 105*d*. Consequently, there can be greatly reduced a possibility that the server 15 will become hung up as a result of concentration of great load on a single constituent element. Thus, there can be provided the highly-reliable server 15 and electronic asset utilization system.

Further, the server is provided separately from the electronic asset status management section 103. The server can quickly and efficiently respond to an inquiry from a customer or system maintenance, and the expiration date of an exchange certificate and that of a receipt certificate can be readily managed.

Moreover, an expiration date is set for the exchange certificate. When the expiration date of the exchange certificate is close at hand, the server 15 sends a message indicating that the expiration date is at hand or a request for downloading an electronic asset corresponding to the exchange certificate, thereby preventing the user from forgetting to exchange the exchange certificate with an electronic asset. Thus, highly-convenient service can be offered to the user.

The above mentioned invention can be realized not only in the electronic asset utilization system composed of two units, namely, the mobile terminal 13 (or the fixed terminal 11) and the server 15, but also the electronic asset utilization system composed of three units, namely, the mobile terminal 13, the server 15 and the fixed terminal 11. In a case the electronic asset utilization system composed of three units in that communication are established between the mobile terminal 13 and the server 15 by way of the stationary terminal 11 connected to the communications network; particularly, where the communications network is a cable, submission of an exchange certificate, transmission of an electronic asset, submission of a receipt certificate, and settlement of a charge billed to the electronic asset can be carried out more thoroughly than in the case where the stationary terminal is connected to the server by means of radio communications. Further, in the case of the system including the fixed terminal 11 located in the convenience store, the users who have the exchange certificate or the receipt certificate come to the store in which the fixed terminal 11 is located. Thus, the store can expect the effect of collection of customer. Further, in a case where exchange of data between the mobile terminal 13 and the stationary terminal 11 does not incur any communications cost, the users owning the mobile terminals 13, 13' can establish communication without consideration of communications cost. Moreover, data transmission between the server 15 and the mobile terminals 13, 13' is performed through the fixed terminal 11, thereby the following problems are solved. First, because of the display portion of the mobile terminals 13, 13' is smaller than that of the fixed terminal 11, it is restricted the data amount which can be displayed on the mobile terminal 13. Second, because of the memory capacity of the mobile terminals 13, 13' is smaller than that of the fixed terminal 11, it is restricted the data amount which can be stored in the mobile terminal 13.

As has been described above, in the present invention, the terminal instructs the server to transmit a desired electronic asset on a predetermined date and time by way of the communications network (in the instruction step). The server transmits the desired electronic asset to the terminal or another predetermined terminal on the predetermined date and time by way of the communications network (in the electronic asset transmission step).

Particularly, the settlement processing means settles a charge billed to the electronic asset instructed by the terminal (in the settlement step). After the settlement processing means has settled the charge (in the settlement step), the issuance means issues an exchange certificate verifying the user's right to receive the electronic asset, and the electronic asset corresponding to the exchange certificate (in the issuance step). The processing means transmits to the terminal or another predetermined terminal (in the exchange certificate transmission step) the exchange certificate issued by the issuance means (in the issuance step). Further, on the predetermined date and time, the processing means transmits the electronic asset to the terminal to which the exchange certificate has been transmitted (in the electronic asset transmission step).

Further, in the present invention, the terminal requests the server to purchase a desired electronic asset by way of the communications network (in the purchase request step). The settlement processing means of the server settles a charge billed to the electronic asset requested by the terminal (in the settlement step). After the settlement processing means has settled the charge (in the settlement step), the issuance means issues an exchange certificate capable of being exchanged for the electronic asset, and the electronic ticket corresponding to the exchange certificate (in the issuance step). The processing means transmits to the terminal or another predetermined terminal (in the exchange certificate transmission step) the exchange certificate issued by the issuance means (in the issuance step). In a case where the terminal submits an exchange certificate by way of the communications network (in the exchange certificate submission step), the processing means transmits, to the terminal that has submitted the exchange certificate, the electronic asset corresponding to the exchange certificate (in the electronic asset transmission step).

In the present invention, the terminal requests the server to book a desired electronic asset by way of the communications network (in the booking request step). The issuance means of the server issues a receipt certificate verifying booking of the requested electronic asset (in the receipt certificate issuance step). The processing means transmits to the terminal or another predetermined terminal (in the receipt certificate transmission step) the receipt certificate issued by the issuance means (in the receipt certificate issuance step). In a case where the receipt certificate is submitted to the server by way of the communications network (in the receipt certificate submission step), the settlement processing means settles a charge billed to the electronic asset corresponding to the receipt certificate, in accordance with requirements described on the receipt certificate (in the settlement step). After the settlement processing means has settled the charge (in the settlement step), the issuance means issues the electronic asset corresponding to the receipt certificate (in the electronic asset issuance step), and the processing means transmits (in the electronic asset transmission step) the thus-issued electronic asset (in the electronic asset issuance step) to the terminal that has submitted the receipt certificate.

As mentioned above, the server can download a corresponding electronic asset on a desired date and time or when a receipt certificate is submitted to the server. Therefore, there can be offered service of various types meeting needs of the users who use the electronic asset utilization system; for example, service in which a charge billed to an electronic asset has been settled at a time convenient to the user and the electronic asset is downloaded whenever necessary. Therefore, the present invention can provide an electronic asset utilization system capable of offering highly-convenient and flexible service, a corresponding electronic asset utilization method, a server for use with the electronic asset utilization system, and a recording medium having recorded thereon the electronic asset utilization method.

Processing to be performed by the server is distributed among a plurality of constituent elements; that is, the settlement processing means, the issuance means, and the processing means. Consequently, there can be greatly reduced a possibility that the server will become hung up as a result of concentration of great load on a single constituent element. A highly-reliable electronic asset utilization system and server can be provided.

What is claimed is:

1. An electronic asset utilization system comprising:
a first terminal connected to a communications network, said first terminal including:
means for sending an order for purchasing an electronic asset including electronic data for obtaining a service or product being offered for sale by a vendor,
means for electronically requesting the issuance of said electronic asset on a predetermined date and time,
means for electronically transmitting financial information to support said purchase of said electronic asset, and
means for receiving settlement information about said purchase; and
a server connected to the communications network, said server including:
a user processing section for receiving said order from said first terminal;
a settlement processing section for receiving said financial information from said first terminal, and for settling a charge for said purchase in response to receiving said financial information, and also for electronically transmitting said settlement information about the purchase to said first terminal after settling said charge,
an exchange certificate issuance section for electronically transmitting an exchange certificate including electronic data to said first terminal or to a second terminal in response to said order, wherein said exchange certificate is used for verifying a user's right to receive said electronic asset,
an electronic asset issuance section for electronically transmitting said electronic asset corresponding to, and in exchange for, the exchange certificate, at said predetermined date and time, said transmitting to one of said first terminal, said second terminal, or a third terminal, and
an electronic asset status management section for ensuring that said electronic asset is transmitted to said one of said first terminal, said second terminal, or said third terminal only if said exchange certificate has been transmitted to said server from said one of said first terminal, said second terminal, or said third terminal;
wherein said exchange certificate includes information about obtaining said electronic asset, and further
wherein said electronic asset is for obtaining the service or product from the vendor.

2. The electronic asset utilization system of claim 1, wherein said issuance of said exchange certificate occurs only after said settlement processing section has settled the charge.

3. The electronic asset utilization system as defined in claim 2, wherein, in a case where said second terminal receiving said exchange certificate is a portable mobile terminal, submission of said exchange certificate to the server and/or transmission of the electronic asset to the second terminal that has the exchange certificate are carried out by way of a stationary terminal which can exchange data with the terminal.

4. The electronic asset utilization system as defined in claim 2, wherein the exchange certificate comprises settlement information indicating that the charge billed to the electronic asset has already been settled, and status information indicating that the corresponding electronic asset has not yet been received.

5. The electronic asset utilization system as defined in claim 4, wherein an expiration date by which the exchange certificate can be exchanged for the corresponding electronic asset is set for the exchange certificate.

6. The electronic asset utilization system as defined in claim 5, wherein, in a case where the exchange certificate has not yet been exchanged for the electronic asset even though the expiration date has nearly arrived, the server sends, to the one of said first, second, or another terminal to which the exchange certificate has been transmitted, a message indicating that the expiration date has nearly arrived.

7. The electronic asset utilization system as defined in claim 5, wherein, in a case where the exchange certificate has not yet been exchanged for the electronic asset even when the expiration date has nearly arrived, the server issues to the one of said first, second, or another terminal to which the exchange certificate has been transmitted a request for downloading the electronic asset or forcibly transmits the electronic asset to the one of said first, second, or another terminal to which the exchange certificate has been transmitted.

8. The electronic asset utilization system as defined in claim 5, wherein the server further includes past-due processing means, and in the event that the exchange certificate still has not been exchanged for the corresponding electronic asset even after lapse of the expiration date of the exchange certificate, the past-due processing means sends, to the one of said first, second, or another terminal to which the exchange certificate has been transmitted, a message indicating that the expiration date has passed and a request for downloading the electronic asset, or forcedly transmits the electronic asset.

9. The electronic asset utilization system as defined in 8, wherein the past-due processing means issues to the one of said first, second, or another terminal to which the exchange certificate has been transmitted a request for deleting or invoking the expired exchange certificate.

10. The electronic asset utilization system as defined in 8, wherein, upon receipt of the message or the download request from the server, the one of said first, second, or another terminal indicates, on a display section, the message or details of the download request and/or details of the exchange certificate.

11. The electronic asset utilization system as defined in claim 8, wherein, upon receipt of the message or the download request from the server, the one of said first, second, or another terminal issues voice notification indicating receipt of the message or the download request.

12. The electronic asset utilization system as defined in claim 9, wherein, upon receipt of the request for deleting or invoking the expired exchange certificate from the past-due processing means, the one of said first, second, or another terminal deletes or invokes the exchange certificate.

13. The electronic asset utilization system as defined in claim 1, wherein the server further includes electronic asset status management means for managing the date and the time of issuance status of the electronic asset, an effective term of the electronic asset, whether there is the exchange certificate or not, and the effective term of the exchange certificate, wherein the electronic asset is issued by the issuance section, and wherein the exchange certificate is managed correspondingly to the electronic asset.

14. The electronic asset utilization system as defined in claim 5, wherein, in a case where the exchange certificate has not yet been exchanged for the electronic asset corresponding to the exchange certificate even when the expiration date has nearly arrived, the server sends, to the terminal to which the exchange certificate has been transmitted, a message indicating that the expiration date has nearly arrived, and in a case where the exchange certificate has not yet been exchanged for the electronic asset corresponding to the exchange certificate even when the expiration date is imminent, the server issues to the terminal to which the exchange certificate has been transmitted a request for downloading the electronic asset, or forcibly transmits the electronic asset corresponding to the exchange certificate to the terminal.

15. The electronic asset utilization system as defined in claim 1, wherein the exchange certificate comprises settlement information indicating that the charge billed to the electronic asset has already been settled, and status information indicating that the corresponding electronic asset has not yet been received.

16. The electronic asset utilization system as defined in claim 6, wherein, in a case where the exchange certificate has not yet been exchanged for the electronic asset corresponding to the exchange certificate even when the expiration date has nearly arrived, the server issues to the terminal to which the exchange certificate has been transmitted a request for downloading the electronic asset or forcibly transmits the electronic asset corresponding to the exchange certificate to the terminal.

17. The electronic asset utilization system as defined in claim 5, wherein the server has past-due processing means, and in the event that the exchange certificate still has not been exchanged for the corresponding electronic asset even after lapse of the expiration date of the exchange certificate, the past-due processing means sends, to the terminal to which the exchange certificate has been transmitted, a message indicating that the expiration date has passed and a request for downloading the electronic asset, or forcibly transmits the electronic asset.

18. The electronic asset utilization system as defined in claim 17, wherein the past-due processing means issues to the terminal to which the exchange certificate has been transmitted a request for deleting or invoking the expired exchange certificate.

19. The electronic asset utilization system as defined in claim 18, wherein, upon receipt of the message or the download request from the server, the terminal to which the exchange certificate has been transmitted indicates, on a display section, the message or details of the download request and/or details of the exchange certificate.

20. The electronic asset utilization system as defined in claim 19, wherein the server has retransmission processing means, and, in the event that transmission of the electronic asset or the exchange certificate has failed, retransmission processing means comprised in said server retransmits the electronic asset or the exchange certificate, respectively.

21. The electronic asset utilization system as defined in one of claims 6, 7, and 16, wherein past-due processing means comprised in said server issues to the terminal to which the exchange certificate has been transmitted a request for deleting or invoking the exchange certificate that has expired.

22. The electronic asset utilization system as defined in claim 21, wherein, upon receipt of a request for deleting or invoking the expired exchange certificate from the past-due processing means, the terminal deletes or revokes the exchange certificate.

23. The electronic asset utilization system as defined in claim 6, wherein, upon receipt of the message or the message from the server, the terminal that received the exchange certificate indicates, on a display section, the message and/or information of the exchange certificate.

24. The electronic asset utilization system as defined in claim 6, wherein, upon receipt of the message from the server, the terminal issues voice notification indicating receipt of the message.

25. The electronic asset utilization system as defined in claim 1, wherein the server further comprises retransmission processing means, and, in the event that transmission of the electronic asset or the exchange certificate has failed, the retransmission processing means retransmits the electronic asset or the exchange certificate, respectively.

26. An electronic asset utilization method comprising the steps of:
purchasing an electronic asset including electronic data, including the steps of:
sending an order for purchasing said electronic asset for obtaining a service or product being offered for sale by a vendor,
requesting the issuance of said electronic asset on a predetermined date and time,
electronically transmitting financial information to support said purchase of said electronic asset, and
receiving settlement information about said purchase; and
issuing said electronic asset, including the steps of:
receiving said order from said first terminal;
receiving said financial information from said first terminal,
settling a charge for said purchase in response to receiving said financial information,
electronically transmitting said settlement information about the purchase to said first terminal after settling said charge,
electronically transmitting an exchange certificate including electronic data in response to said order, wherein said exchange certificate verifies a user's right to receive said electronic asset, and electronically transmitting said electronic asset corresponding to, and in exchange for, the exchange certificate, at said predetermined date and time, said transmitting to the user;

wherein said electronic asset is transmitted only if said exchange certificate has been provided by the user prior to issuing said electronic asset, and wherein said exchange certificate includes information about obtaining said electronic asset, and further wherein said electronic asset is for obtaining the service or product from the vendor.

27. A server connected to a terminal by way of a communications network, said server for use in an electronic asset utilization system, said server comprising:

a user processing section for receiving an order from a first terminal for purchasing an electronic asset including electronic data for obtaining a service or product being offered for sale by a vendor, wherein said electronic asset is to be electronically transmitted at a predetermined date and time;

a settlement processing section for receiving said financial information from said first terminal, and for settling a charge for said purchase in response to receiving said financial information, and also for electronically transmitting said settlement information about the purchase to said first terminal after settling said charge, an exchange certificate issuance section for electronically transmitting an exchange certificate including electronic data to said first terminal or to a second terminal in response to said order, wherein said exchange certificate verifies a user's right to receive said electronic asset, an electronic asset issuance section for electronically transmitting said electronic asset corresponding to, and in exchange for, the exchange certificate, at said predetermined date and time, said transmitting to one of said first terminal, said second terminal, or a third terminal, and an electronic asset status management section for ensuring that said electronic asset is transmitted to said one of said first terminal, said second terminal, or said third terminal only if said exchange certificate has been transmitted to said server from said one of said first terminal, said second terminal, or said third terminal, wherein said exchange certificate includes information about obtaining said electronic asset, and further wherein said electronic asset is for obtaining the service or product from the vendor.

28. A server connected to a terminal by way of a communications network, said server for use in an electronic asset utilization system, said server comprising:

a user processing section for receiving an order from a first terminal for purchasing an electronic asset including electronic data for obtaining a service or product being offered for sale by a vendor;

a settlement processing section for receiving said financial information from said first terminal, and for settling a charge for said purchase in response to receiving said financial information, and also for electronically transmitting said settlement information about the purchase to said first terminal after settling said charge, an exchange certificate issuance section for electronically transmitting an exchange certificate including electronic data to the first terminal or to a second terminal in response to said order, wherein said exchange certificate verifies a user's right to receive said electronic asset, an electronic asset issuance section for electronically transmitting said electronic asset corresponding to, and in exchange for, the exchange certificate, said transmitting to said one of the first terminal or the second terminal occurring only if said exchange certificate has been transmitted to said server from a same one of said one of said first terminal, said second terminal, or said third terminal, and said exchange certificate has been verified;

wherein said exchange certificate includes information about obtaining said electronic asset, and further wherein said electronic asset is for exchanging for the service or product from the vendor.

29. The server of claim 28, wherein said electronic asset is transmitted in exchange for said exchange certificate only if said charge has been settled by said settlement processing section.

30. An electronic asset utilization method comprising the steps of:

purchasing an electronic asset including electronic data, said purchasing including the steps of:

sending an order for purchasing said electronic asset for obtaining a service or product being offered for sale by a vendor, electronically transmitting financial information to support said purchase of said electronic asset, and receiving settlement information about said purchase; and issuing said electronic asset, including the steps of:

receiving said order from said first terminal;

receiving said financial information from said first terminal, settling a charge for said purchase in response to receiving said financial information, electronically transmitting said settlement information about the purchase to said first terminal after settling said charge, electronically transmitting an exchange certificate including electronic data in response to said order, wherein said exchange certificate verifies a user's right to receive said electronic asset, and electronically transmitting said electronic asset corresponding to, and in exchange for, the exchange certificate only if said exchange certificate has been provided by the user prior to issuing said electronic asset, and only if said exchange certificate has been validated;

wherein said exchange certificate includes information about obtaining said electronic asset, and further wherein said electronic asset is for being exchanged by the user for obtaining the service or product from the vendor.

31. The server of claim 30, wherein said electronic asset is transmitted in exchange for said exchange certificate only if said charge has been settled.

* * * * *